(12) United States Patent
de Oliveira Antunes et al.

(10) Patent No.: US 11,759,988 B2
(45) Date of Patent: Sep. 19, 2023

(54) APPARATUS AND METHOD FOR CONTROLLING INJECTION MOLDING

(71) Applicant: Synventive Molding Solutions, Inc., Peabody, MA (US)

(72) Inventors: Sergio Ribeiro de Oliveira Antunes, Amesbury, MA (US); Ahmed Alnazer, Madbury, NH (US); Gregory Smith, Leominster, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 800 days.

(21) Appl. No.: 16/217,443

(22) Filed: Dec. 12, 2018

(65) Prior Publication Data

US 2019/0111603 A1 Apr. 18, 2019

Related U.S. Application Data

(63) Continuation of application No. PCT/US2018/017422, filed on Feb. 8, 2018.
(Continued)

(51) Int. Cl.
*G06F 3/0484* (2022.01)
*G09G 5/00* (2006.01)
(Continued)

(52) U.S. Cl.
CPC ........ *B29C 45/762* (2013.01); *B29C 45/2806* (2013.01); *B29C 45/76* (2013.01);
(Continued)

(58) Field of Classification Search
CPC .. G05B 2219/2624; G05B 2219/25312; G05B 2219/23109
See application file for complete search history.

(56) References Cited

U.S. PATENT DOCUMENTS 5,539,650 A * 7/1996 Hehl .................... B29C 45/766
425/149
8,417,371 B2 4/2013 Werfeli
(Continued)

FOREIGN PATENT DOCUMENTS

WO 2008071669 A1 6/2008

OTHER PUBLICATIONS

International Preliminary Report on Patentability in PCT/US2018/017422 dated Jun. 13, 2019.
(Continued)

*Primary Examiner* — Armand Melendez
(74) *Attorney, Agent, or Firm* — Polsinelli, P.C.

(57) ABSTRACT

An apparatus and method for establishing triggers for the opening of one or multiple gates to a mold cavity of an injection molding system, followed by a sequence of predetermined valve pin movements over the course on an injection cycle. In one embodiment, the invention provides a graphical user interface and control system enabling a user to select from and arrange a plurality of virtual icons into a user-defined virtual sequence that define associated triggering events and actuator controlled pin movements over the course of an injection cycle. In various embodiments, the apparatus and method allows the system operator to view a simulated profile of such triggers and movements and to compare the simulated profile to an actual profile to access differences and make adjustments to the triggers and sequencing more quickly and efficiently. This is particularly useful in sequential molding systems where multiple gates need to be programmed and adjusted to compensate for variations from a predetermined sequence.

16 Claims, 29 Drawing Sheets

Related U.S. Application Data

(60) Provisional application No. 62/473,768, filed on Mar. 20, 2017, provisional application No. 62/456,364, filed on Feb. 8, 2017.

(51) Int. Cl.
| | |
|---|---|
| *B29C 45/76* | (2006.01) |
| *B29C 45/77* | (2006.01) |
| *B29C 45/28* | (2006.01) |
| *G06F 3/048* | (2013.01) |
| *G06F 3/04847* | (2022.01) |
| *G06F 3/04817* | (2022.01) |
| *G06F 3/0481* | (2022.01) |
| *G06F 3/0482* | (2013.01) |
| *G06F 3/04886* | (2022.01) |
| *G06F 3/04842* | (2022.01) |
| *G06F 3/0486* | (2013.01) |
| *G06F 3/04812* | (2022.01) |
| *G06F 3/033* | (2013.01) |
| *G06F 8/34* | (2018.01) |
| *G05B 23/02* | (2006.01) |
| *G05B 19/042* | (2006.01) |
| *G05B 19/05* | (2006.01) |
| *G06F 8/35* | (2018.01) |
| *G05B 19/045* | (2006.01) |
| *G05B 19/10* | (2006.01) |
| *G05B 13/04* | (2006.01) |
| *G05B 19/23* | (2006.01) |
| *G05B 19/409* | (2006.01) |
| *B29C 45/00* | (2006.01) |

(52) U.S. Cl.
CPC .............. *B29C 45/77* (2013.01); *G05B 13/04* (2013.01); *G05B 19/042* (2013.01); *G05B 19/045* (2013.01); *G05B 19/0426* (2013.01); *G05B 19/05* (2013.01); *G05B 19/056* (2013.01); *G05B 19/10* (2013.01); *G05B 19/104* (2013.01); *G05B 19/108* (2013.01); *G05B 19/23* (2013.01); *G05B 19/409* (2013.01); *G05B 23/024* (2013.01); *G05B 23/0216* (2013.01); *G05B 23/0224* (2013.01); *G06F 3/033* (2013.01); *G06F 3/048* (2013.01); *G06F 3/0481* (2013.01); *G06F 3/0482* (2013.01); *G06F 3/0484* (2013.01); *G06F 3/0486* (2013.01); *G06F 3/04812* (2013.01); *G06F 3/04817* (2013.01); *G06F 3/04842* (2013.01); *G06F 3/04847* (2013.01); *G06F 3/04886* (2013.01); *G06F 8/34* (2013.01); *G06F 8/35* (2013.01); *G09G 5/003* (2013.01); *G09G 5/005* (2013.01); *G09G 5/006* (2013.01); *G09G 5/008* (2013.01); *B29C 2045/0032* (2013.01); *B29C 2045/2872* (2013.01); *B29C 2045/7606* (2013.01); *B29C 2945/76598* (2013.01); *B29C 2945/76755* (2013.01); *G05B 2219/13144* (2013.01); *G05B 2219/23258* (2013.01); *G05B 2219/23286* (2013.01); *G05B 2219/24088* (2013.01); *G05B 2219/31472* (2013.01); *G05B 2219/32351* (2013.01); *G05B 2219/36133* (2013.01); *G05B 2219/36168* (2013.01); *G05B 2219/45244* (2013.01)

(56) References Cited

U.S. PATENT DOCUMENTS

| | | | |
|---|---|---|---|
| 2007/0240080 A1* | 10/2007 | Eldridge | G06F 8/34 717/113 |
| 2012/0119419 A1* | 5/2012 | Yeager | G06F 3/0482 425/162 |
| 2014/0046465 A1* | 2/2014 | de Oliveira Antunes | B29C 45/2703 700/97 |

OTHER PUBLICATIONS

International Search Report and Written Opinion of the International Searching Authority in PCT/US2018/017422, dated Apr. 19, 2018.

Second Written Opinion of International Preliminary Examing Authority in PCT/US2018/017422, dated Feb. 20, 2019.

* cited by examiner

| TRIGGERS 242 | | | |
|---|---|---|---|
| 242a | 242b | 242c | 242d |
| Mold Closed | Machine Injection Cycle Starts When Screw Starts to Move Forwards | Machine Screw Reaches the Specified Position | Pressure |
| 242e | 242f | 242g | 242h |
| Mold Opened | Injection Cycle Ends and the Screw Starts to Recover | Machine Reaches Switch over to Pack | Temperature |

Timer 243

| Move-to 244 | |
|---|---|
| ■ 244a<br>Move Pin to Fully Opened Position | ■ 244b<br>Move Pin to Fully Closed Position |
| 244c<br>Move Pin to Specific Position between Fully Opened and Fully Closed | 244d<br>Move Pin to Maintain Desired Melt Pressure Profile |

Pre-Sets 248

Value Pin Profile-Two Openings First Opening with Slow Speed Second Opening for Packing

Value Pin Profile-Two Openings First Opening with Full Speed for Filling Second Opening for Packing

APPARATUS AND METHOD FOR CONTROLLING INJECTION MOLDING

RELATED APPLICATIONS

This application is a continuation of and claims the benefit of priority to PCT Application No. PCT/US2018/017422 filed on Feb. 8, 2018, which claims the benefit of priority to U.S. Application Ser. Nos. 62/456,364 filed Feb. 8, 2017, and 62/473,768 filed Mar. 20, 2017, the disclosures of which are incorporated by reference as if fully set forth in their entirety herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed August 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar., 19, 2002 (7070) and PCT application no. PCT/US2011/029721 filed Mar. 24, 2011 (7094), PCT publication no. WO2012074879 (A1) (7100WO0) and WO2012087491 (A1) (7100W01) and PCT/US2013/75064 (7129WO0) and PCT/US2014/19210 (7129WO1) and PCT/U52014/31000 (7129WO2).

FIELD OF THE INVENTION

The present invention relates to injection molding systems and methods, and more particularly to a system and method for triggering and timing the opening of valve pins in a sequence of moves.

BACKGROUND OF THE INVENTION

Injection molding systems that feature sequential opening of multiple gates to a single mold cavity provide significant advantages to the molding of large scale parts, such as automobile body parts. The benefits of sequential valve gating depend upon the sequential timing between the upstream and downstream gates, so that the melt flows from each gate coalesce into a single smooth flow stream in the cavity. Otherwise, air bubbles or surface defects in the molded part will occur.

Also beneficial, for both sequencing the opening of multiple gates or just a single gate, is controlling the valve pin during a single cycle to include a plurality of predetermined moves, where the position and rate of movement of the valve pin can be controlled. Such recipes or sequences of moves are often referred to as a pin profile, and illustrated in graphical form as a two dimensional graph of pin position versus time. However, an actual profile recorded during a cycle, may vary significantly from the desired profile, and thus setting the parameters to attempt to achieve a desired pin profile requires a comprehensive understanding of the parameters (melt temperature, shot size, channel length, cavity size, melt pressure and other flow parameters) that can affect the injection process in any given cycle, and often results in multiple trial and error runs with adjustments being made between each trial. A skilled operator is required to assess the actual profile and determine appropriate adjustments to be made, and significant time may be spent on entering and adjusting the parameters provided to the system controller.

It would thus be desirable to provide a control system and method that is easier and requires less time to set up and adjust for one or more gates of an injection molding apparatus.

SUMMARY OF THE INVENTION

In various embodiments, the invention relates to an apparatus and method for establishing triggers for the opening of one or multiple gates to a mold cavity of an injection molding system, followed by a sequence of predetermined valve pin movements over the course on an injection cycle.

In one embodiment, the invention provides a graphical user interface and control system enabling a user to select from and arrange a plurality of virtual icons into a user-defined virtual sequence that define associated triggering events and actuator controlled pin movements over the course of an injection cycle.

In various embodiments, the apparatus and method allows the system operator to view a simulated profile of such triggers and movements and to compare the simulated profile to an actual profile to access differences and make adjustments to the triggers and sequencing more quickly and efficiently. This is particularly useful in sequential molding systems where multiple gates need to be programmed and adjusted to compensate for variations from a predetermined sequence.

In one embodiment, the user interface further displays a plurality of pre-set icons each corresponding to a preselected set of valve pin control functions for a valve pin during the course of an injection cycle, wherein the user can select a pre-set icon and the system then prompts the user to confirm a sequence of pin movements, or edit the sequence by adding, deleting, or modifying the triggers of the pre-set sequence, and to add values (such as time or position) for the various movements in the sequence, including use of one or more icons for individual triggers, delay, move to position, pin profiling, pin velocities, and sensitivity.

In another embodiment there is provided an injection molding system comprising an injection machine that injects injection fluid during the course of an injection cycle to one or more downstream fluid delivery channels that deliver the injection fluid to a gate leading to a cavity of a mold, each downstream fluid delivery channel having a valve comprised of an actuator that drives a valve pin that is driven upstream and downstream between a downstream gate closed position and an upstream gate open position, the system including a valve pin control system comprised of a user interface that displays a plurality of icons each corresponding to a preselected valve pin control function including one or more functions that control positioning or controlled driving of the pin during the course of the injection cycle to one or more selected intermediate positions between the gate closed and the open position including one or more intermediate positions that restrict flow of the injection fluid to less than a maximum rate of flow, the one or more functions including controlling trigger functions including triggering of movement of the valve pin to the gate closed position, to the upstream gate open position and to one or more intermediate positions, sequence of valve pin movement, timing of valve pin movement, velocity of valve pin movement, positioning of valve pin movement, movement of the valve pin to control injection fluid pressure within the downstream fluid delivery channel or within the cavity or within flow of injection fluid upstream of the downstream fluid delivery channel, positioning valve pin movement to follow a profile of valve pin position or pressure of injection fluid or temperature of injection at one or more positions within the downstream fluid delivery channel or within the cavity or within flow of injection fluid upstream of the downstream fluid delivery channel, and controlling or setting sensitivity of detection of responsiveness to one or more the foregoing functions.

First Claim Set

In one embodiment, an injection molding system for initiating flow of fluid material into one or more gates of a mold cavity during an injection molding cycle is provided, the system comprising:

a valve comprising a fluid flow passage for delivering fluid material to a gate of a mold cavity, and an actuator that drives a valve pin between a downstream gate closed position and an upstream gate open position, and to one or more intermediate positions between the open and closed positions that restricts flow of the fluid material through the gate to less than a maximum flow rate;

the system further including a valve pin control system comprised of:

a controller including a set of instructions that define a set of preselected control functions and event triggers for generating and transmitting instructions to the actuator of the valve to drive the valve pin between the open, closed and intermediate positions during the course of an injection molding cycle;

a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin:

a) to the open position, the closed position, or an intermediate position between the open and closed positions, or b) to follow a pressure profile;

the controller communicating with the user interface and further including a set of instructions that enable the user, via the user interface, to select and arrange a plurality of the virtual icons in a sequence that virtually represents a sequence of control functions for the actuator to implement during the course of an injection cycle.

In one embodiment an injection molding system is provided, further including:

a velocity control icon virtually representing a preselected control function to set a travel velocity for an associated movement of the valve pin.

In one embodiment an injection molding system is provided, further including:

a timer icon virtually representing a preselected control function to set a delay time before initiating an associated movement of the valve pin.

In one embodiment an injection molding system is provided, further including:

one or more preset icons each virtually representing a preselected plurality of control functions that define a sequence of associated movements of the valve pin.

In one embodiment an injection molding system is provided, further including:

one or more sensitivity icons each virtually representing a preselected control function defining a control sensitivity for an associated movement of the valve pin.

In one embodiment an injection molding system is provided, wherein:

the user interface includes a canvas space onto which the user moves and arranges the selected virtual icons into the sequence that virtually represents the sequence of control functions for the actuator to implement during the course of an injection cycle.

In one embodiment an injection molding system is provided, wherein:

the user interface accepts user input for selection among one or more of storing, copying and editing the sequence.

In one embodiment an injection molding system is provided, wherein:

in response to user selection of one of the icons, the user interface prompts the user to enter a parameter further defining the associated control function.

In one embodiment an injection molding system is provided, wherein:

the move-to icons include icons representing control functions for an associated movement toward the gate open position, toward the gate closed position and toward a user selectable intermediate position.

In one embodiment an injection molding system is provided, wherein:

the move-to icons include a pressure profile icon representing control functions for an associated sequence of pin movements to follow a pressure profile over time.

In one embodiment an injection molding system is provided, wherein:

the controller includes instructions that, in response to a signal received from the interface of a user selection of one of the plurality of icons, causes the user interface to display an entry device for selection of a parameter value for the associated control function.

In one embodiment an injection molding system is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment an injection molding system is provided, wherein:

the controller includes instructions to the actuator to drive the valve pin at a travel velocity in a range from zero to a maximum velocity and including one or more intermediate travel velocities between zero and the maximum.

In one embodiment an injection molding system is provided, wherein:

the controller includes instructions to the actuator to drive the valve pin to a predetermined hold and pack position between the open and closed positions.

In one embodiment a computer implemented method is provided for initiating flow of fluid material through a fluid flow passage of a valve and into one or more gates of a mold cavity during an injection molding cycle, wherein a controller includes a set of instructions that define a set of preselected control functions and event triggers for generating and transmitting instructions to an actuator to drive a valve pin between open, closed and intermediate positions that restricts flow of the fluid material through the gate to less than a maximum flow during the course of an injection molding cycle, the method comprising:

providing a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin:
a) to the open position, the closed position, or an intermediate position between the open and closed positions, or
b) to follow a pressure profile;

the controller communicating with the user interface and further including a set of instructions that enable the user, via the user interface, to select and arrange a plurality of the virtual icons in a sequence that virtually represents a sequence of control functions for the actuator to implement during the course of an injection cycle, wherein the method includes steps of:
a user selecting via the interface a trigger icon and arranging the selected trigger icon as a first icon of the sequence,
a user selecting via the interface a move-to icon and arranging the selected trigger icon as a second icon of the sequence,
wherein the user may select and arrange additional icons to complete the sequence.

In one embodiment a method is provided, further including:
generating a simulated pin profile according to the sequence and displaying the simulated pin profile via the interface to a user.

In one embodiment a method is provided, further including:
driving the valve pin over the course of an injection cycle according to the sequence.

In one embodiment a method is provided, further including:
monitoring the valve pin position over the course of the injection cycle and generating an actual pin profile,
displaying the actual pin profile via the interface to the user.

In one embodiment a method is provided, further including:
displaying via the interface a user entry device that prompts the user to enter a parameter value further defining the associated control function.

In one embodiment a method is provided, further including:

receiving and displaying via the interface a parameter value entered by the user with the selected icon defining the associate control function.

In one embodiment a method is provided, wherein:
the entry device prompts the user to enter a parameter value for one or more of pin velocity, pressure of the fluid material in the flow passage or mold cavity, an intermediate pin position between the open and closed positions, control sensitivity, and time delay.

In one embodiment a method is provided, wherein:
the user interface accepts a user input for selection among one or more of storing, copying and editing the sequence.

In one embodiment a method is provided, further including:
displaying via the interface a velocity control icon virtually representing a preselected control function to set a travel velocity for an associated movement of the valve pin.

In one embodiment a method is provided, further including:
displaying via the interface a timer icon virtually representing a preselected control function to set a delay time before initiating an associated movement of the valve pin.

In one embodiment a method is provided, further including:
displaying via the interface one or more preset icons each virtually representing a preselected plurality of control functions that define a sequence of associated movements of the valve pin.

In one embodiment a method is provided, further including:
displaying via the interface one or more sensitivity icons each virtually representing a preselected control function defining a control sensitivity for an associated movement of the valve pin.

In one embodiment a method is provided, wherein:
displaying via the interface a canvas space onto which the user moves and arranges the selected virtual icons into the sequence that virtually represents the sequence of control functions for the actuator to implement during the course of an injection cycle.

In one embodiment a method is provided, wherein:
the move-to icons include icons representing control functions for an associated movement toward the gate open position, toward the gate closed position and toward a user selectable intermediate position.

In one embodiment a method is provided, wherein:
the move-to icons include a pressure profile icon representing control functions for an associated sequence of pin movements to follow a pressure profile over time.

In one embodiment a method is provided, wherein:
the controller instructs the actuator to drive the valve pin at a travel velocity in a range from zero to a maximum velocity and including one or more intermediate travel velocities between zero and the maximum.

In one embodiment a method is provided, wherein:
the controller instructs the actuator to drive the valve pin to a predetermined hold and pack position between the open and closed positions.

Second Claim Set

In one embodiment an injection molding system for initiating flow of fluid material into one or more gates of a mold cavity during an injection molding cycle is provided, the system comprising:
a valve comprising a fluid flow passage for delivering fluid material to a gate of a mold cavity, and an actuator that drives a valve pin between a downstream gate closed position and an upstream gate open position, and to one or more intermediate positions between the open and closed positions that restricts flow of the fluid material through the gate to less than a maximum flow rate;

the system further including a valve pin control system comprised of:

a controller including a set of instructions that define a set of preselected control functions and event triggers for generating and transmitting instructions to the actuator of the valve to drive the valve pin between the open, closed and intermediate positions during the course of an injection molding cycle;

a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin to the open position, the closed position, or an intermediate position between the open and closed positions, a velocity control icon virtually representing a preselected control function is set to travel a velocity for an associated movement of the valve pin, the controller communicating with the user interface and further including a set of instructions that enable the user, via the user interface, to select and arrange a plurality of the virtual icons in a sequence that virtually represents a sequence of control functions for the actuator to implement during the course of an injection cycle.

In one embodiment an injection molding system is provided, further including:

a timer icon virtually representing a preselected control function to set a delay time before initiating an associated movement of the valve pin.

In one embodiment an injection molding system is provided, further including:

one or more preset icons each virtually representing a preselected plurality of control functions that define a sequence of associated movements of the valve pin.

In one embodiment an injection molding system is provided, further including:

one or more sensitivity icons each virtually representing a preselected control function defining a control sensitivity for an associated movement of the valve pin.

In one embodiment an injection molding system is provided, wherein:

the user interface includes a canvas space onto which the user moves and arranges the selected virtual icons into the sequence that virtually represents the sequence of control functions for the actuator to implement during the course of an injection cycle.

In one embodiment an injection molding system is provided, wherein:

the user interface accepts user input for selection among one or more of storing, copying and editing the sequence.

In one embodiment an injection molding system is provided, wherein:

in response to user selection of one of the icons, the user interface prompts the user to enter a parameter further defining the associated control function.

In one embodiment an injection molding system is provided, wherein:

the move-to icons include icons representing control functions for an associated movement toward the gate open position, toward the gate closed position and toward a user selectable intermediate position.

In one embodiment an injection molding system is provided, wherein:

the move-to icons include a pressure profile icon representing control functions for an associated sequence of pin movements to follow a pressure profile over time.

In one embodiment an injection molding system is provided, wherein:

the controller includes instructions that, in response to a signal received from the interface of a user selection of one of the plurality of icons, causes the user interface to display an entry device for selection of a parameter value for the associated control function.

In one embodiment an injection molding system is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment an injection molding system is provided, wherein:

the controller includes instructions to the actuator to drive the valve pin at a travel velocity in a range from zero to a maximum velocity and including one or more intermediate travel velocities between zero and the maximum.

In one embodiment an injection molding system is provided, wherein:

the controller includes instructions to the actuator to drive the valve pin to a predetermined hold and pack position between the open and closed positions.

In one embodiment a computer implemented method is provided for initiating flow of fluid material through a fluid flow passage of a valve and into one or more gates of a mold cavity during an injection molding cycle, wherein a controller includes a set of instructions that define a set of preselected control functions and event triggers for generating and transmitting instructions to an actuator to drive a valve pin between open, closed and intermediate positions that restricts flow of the fluid material through the gate to less than a maximum flow during the course of an injection molding cycle, the method comprising:

providing a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin to the open position, the closed position, or an intermediate position between the open and closed positions, a velocity control icon virtually representing a preselect4ed control function to set a travel velocity for an associated movement of the valve pin, the controller communicating with the user interface and further including a set of instructions that enable the user, via the user interface, to select and arrange a plurality of the virtual icons in a sequence that virtually represents a sequence of control functions for the actuator to implement during the course of an injection cycle, wherein the method includes steps of:

a user selecting via the interface a trigger icon and arranging the selected trigger icon as a first icon of the sequence, a user selecting via the interface a move-to icon and arranging the selected trigger icon as a second icon of the sequence, wherein the user may select and arrange additional icons to complete the sequence.

In one embodiment a method according to claim 16 is provided, further including:

generating a simulated pin profile according to the sequence and displaying the simulated pin profile via the interface to a user.

In one embodiment a method is provided, further including:

driving the valve pin over the course of an injection cycle according to the sequence.

In one embodiment a method is provided, further including:

monitoring the valve pin position over the course of the injection cycle and generating an actual pin profile, displaying the actual pin profile via the interface to the user.

In one embodiment a is provided, further including:

displaying via the interface a user entry device that prompts the user to enter a parameter value further defining the associated control function.

In one embodiment a method is provided, further including:

receiving and displaying via the interface a parameter value entered by the user with the selected icon defining the associate control function.

In one embodiment a method is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment a method is provided, wherein:

the user interface accepts a user input for selection among one or more of storing, copying and editing the sequence.

In one embodiment a method is provided, further including:

displaying via the interface a timer icon virtually representing a preselected control function to set a delay time before initiating an associated movement of the valve pin.

In one embodiment a method is provided, further including:

displaying via the interface one or more preset icons each virtually representing a preselected plurality of control functions that define a sequence of associated movements of the valve pin.

In one embodiment a method is provided, further including:

displaying via the interface one or more sensitivity icons each virtually representing a preselected control function defining a control sensitivity for an associated movement of the valve pin.

In one embodiment a method is provided, wherein:

displaying via the interface a canvas space onto which the user moves and arranges the selected virtual icons into the sequence that virtually represents the sequence of control functions for the actuator to implement during the course of an injection cycle.

In one embodiment a method is provided, wherein:

the move-to icons include icons representing control functions for an associated movement toward the gate open position, toward the gate closed position and toward a user selectable intermediate position.

In one embodiment a method is provided, wherein:

the move-to icons include a pressure profile icon representing control functions for an associated sequence of pin movements to follow a pressure profile over time.

In one embodiment a method is provided, wherein:

the controller instructs the actuator to drive the valve pin at a travel velocity in a range from zero to a maximum velocity and including one or more intermediate travel velocities between zero and the maximum.

In one embodiment a method is provided, wherein:

the controller instructs the actuator to drive the valve pin to a predetermined hold and pack position between the open and closed positions.

Third Claim Set

In one embodiment an injection molding system for initiating flow of fluid material into one or more gates of a mold cavity during an injection molding cycle is provided, the system comprising:

a valve comprising a fluid flow passage for delivering fluid material to a gate of a mold cavity, and an actuator that drives a valve pin between a downstream gate closed position and an upstream gate open position, and to one or more intermediate positions between the open and closed positions that restricts flow of the fluid material through the gate to less than a maximum flow rate;

the system further including a valve pin control system comprised of:

a controller including a set of instructions that define a set of preselected control functions and event triggers for generating and transmitting instructions to the actuator of the valve to drive the valve pin between the open, closed and intermediate positions during the course of an injection molding cycle;

a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin to follow a pressure profile;

the controller communicating with the user interface and further including a set of instructions that enable the user, via the user interface, to select and arrange a plurality of the virtual icons in a sequence that virtually represents a sequence of control functions for the actuator to implement during the course of an injection cycle.

In one embodiment an injection molding system is provided, further including:

a velocity control icon virtually representing a preselected control function to set a travel velocity for an associated movement of the valve pin.

In one embodiment an injection molding system is provided, further including:

a timer icon virtually representing a preselected control function to set a delay time before initiating an associated movement of the valve pin.

In one embodiment an injection molding system is provided, further including:

one or more preset icons each virtually representing a preselected plurality of control functions that define a sequence of associated movements of the valve pin.

In one embodiment an injection molding system is provided, further including:

one or more sensitivity icons each virtually representing a preselected control function defining a control sensitivity for an associated movement of the valve pin.

In one embodiment an injection molding system is provided, wherein:

the user interface includes a canvas space onto which the user moves and arranges the selected virtual icons into the sequence that virtually represents the sequence of control functions for the actuator to implement during the course of an injection cycle.

In one embodiment an injection molding system is provided, wherein:

the user interface accepts user input for selection among one or more of storing, copying and editing the sequence.

In one embodiment an injection molding system is provided, wherein:

in response to user selection of one of the icons, the user interface prompts the user to enter a parameter further defining the associated control function.

In one embodiment an injection molding system is provided, wherein:

the move-to icons include icons representing control functions for an associated movement toward the gate open position, toward the gate closed position and toward a user selectable intermediate position.

In one embodiment an injection molding system is provided, wherein:

the move-to icons include a pressure profile icon representing control functions for an associated sequence of pin movements to follow a pressure profile over time.

In one embodiment an injection molding system is provided, wherein:

the controller includes instructions that, in response to a signal received from the interface of a user selection of one of the plurality of icons, causes the user interface to display an entry device for selection of a parameter value for the associated control function.

In one embodiment an injection molding system is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment an injection molding system is provided, wherein:

the controller includes instructions to the actuator to drive the valve pin at a travel velocity in a range from zero to a maximum velocity and including one or more intermediate travel velocities between zero and the maximum.

In one embodiment an injection molding system is provided, wherein:

the controller includes instructions to the actuator to drive the valve pin to a predetermined hold and pack position between the open and closed positions.

In one embodiment a computer implemented method is provided for initiating flow of fluid material through a fluid flow passage of a valve and into one or more gates of a mold cavity during an injection molding cycle, wherein a controller includes a set of instructions that define a set of preselected control functions and event triggers for generating and transmitting instructions to an actuator to drive a valve pin between open, closed and intermediate positions that restricts flow of the fluid material through the gate to less than a maximum flow during the course of an injection molding cycle, the method comprising:

providing a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin to follow a pressure profile;

the controller communicating with the user interface and further including a set of instructions that enable the user, via the user interface, to select and arrange a plurality of the virtual icons in a sequence that virtually represents a sequence of control functions for the actuator to implement during the course of an injection cycle, wherein the method includes steps of:

a user selecting via the interface a trigger icon and arranging the selected trigger icon as a first icon of the sequence, a user selecting via the interface a move-to icon and arranging the selected trigger icon as a second icon of the sequence, wherein the user may select and arrange additional icons to complete the sequence.

In one embodiment a method is provided, further including:

generating a simulated pin profile according to the sequence and displaying the simulated pin profile via the interface to a user.

In one embodiment a method is provided, further including:

driving the valve pin over the course of an injection cycle according to the sequence.

In one embodiment a method is provided, further including:

monitoring the valve pin position over the course of the injection cycle and generating an actual pin profile, displaying the actual pin profile via the interface to the user.

In one embodiment a method is provided, further including:

displaying via the interface a user entry device that prompts the user to enter a parameter value further defining the associated control function.

In one embodiment a method is provided, further including:

receiving and displaying via the interface a parameter value entered by the user with the selected icon defining the associate control function.

In one embodiment a method is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment a method is provided, wherein:

the user interface accepts a user input for selection among one or more of storing, copying and editing the sequence.

In one embodiment a method is provided, further including:

displaying via the interface a velocity control icon virtually representing a preselected control function to set a travel velocity for an associated movement of the valve pin.

In one embodiment a method is provided, further including:

displaying via the interface a timer icon virtually representing a preselected control function to set a delay time before initiating an associated movement of the valve pin.

In one embodiment a method is provided, further including:

displaying via the interface one or more preset icons each virtually representing a preselected plurality of control functions that define a sequence of associated movements of the valve pin.

In one embodiment a method is provided, further including:

displaying via the interface one or more sensitivity icons each virtually representing a preselected control function defining a control sensitivity for an associated movement of the valve pin.

In one embodiment a method is provided, wherein:

displaying via the interface a canvas space onto which the user moves and arranges the selected virtual icons into the sequence that virtually represents the sequence of control functions for the actuator to implement during the course of an injection cycle.

In one embodiment a method is provided, wherein:

the move-to icons include icons representing control functions for an associated movement toward the gate open position, toward the gate closed position and toward a user selectable intermediate position.

In one embodiment a method is provided, wherein:

the move-to icons include a pressure profile icon representing control functions for an associated sequence of pin movements to follow a pressure profile over time.

In one embodiment a method is provided, wherein:

the controller instructs the actuator to drive the valve pin at a travel velocity in a range from zero to a maximum velocity and including one or more intermediate travel velocities between zero and the maximum.

In one embodiment a method is provided, wherein:

the controller instructs the actuator to drive the valve pin to a predetermined hold and pack position between the open and closed positions.

Fourth Claim Set

In one embodiment an injection molding system for initiating flow of fluid material into one or more gates of a mold cavity during an injection molding cycle is provided, the system comprising:

a valve comprising a fluid flow passage for delivering fluid material to a gate of a mold cavity, and an actuator that drives a valve pin between a downstream gate closed position and an upstream gate open position, and to one or more intermediate positions between the open and closed positions that restricts flow of the fluid material through the gate to less than a maximum flow rate;

the system further including a valve pin control system comprised of:

a controller including a set of instructions that define a set of preselected control functions and event triggers for generating and transmitting instructions to the actuator of the valve to drive the valve pin between the open, closed and intermediate positions during the course of an injection molding cycle;

a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin, wherein the move-to icons include one or more preset icons each virtually representing a preselected plurality of control functions that define a sequence of associated movements of the valve pin, the controller communicating with the user interface and further including a set of instructions that enable the user, via the user interface, to select and arrange a plurality of the virtual icons in a sequence that virtually represents a sequence of control functions for the actuator to implement during the course of an injection cycle.

In one embodiment an injection molding system is provided, further including:

a velocity control icon virtually representing a preselected control function to set a travel velocity for an associated movement of the valve pin.

In one embodiment an injection molding system is provided, further including:

a timer icon virtually representing a preselected control function to set a delay time before initiating an associated movement of the valve pin.

In one embodiment an injection molding system is provided, further including:

one or more sensitivity icons each virtually representing a preselected control function defining a control sensitivity for an associated movement of the valve pin.

In one embodiment an injection molding system is provided, wherein:

the user interface includes a canvas space onto which the user moves and arranges the selected virtual icons into the sequence that virtually represents the sequence of control functions for the actuator to implement during the course of an injection cycle.

In one embodiment an injection molding system is provided, wherein:

the user interface accepts user input for selection among one or more of storing, copying and editing the sequence.

In one embodiment an injection molding system is provided, wherein:

in response to user selection of one of the icons, the user interface prompts the user to enter a parameter further defining the associated control function.

In one embodiment an injection molding system is provided, wherein:

the move-to icons include icons representing control functions for an associated movement toward the gate open position, toward the gate closed position and toward a user selectable intermediate position.

In one embodiment an injection molding system is provided, wherein:

the move-to icons include a pressure profile icon representing control functions for an associated sequence of pin movements to follow a pressure profile over time.

In one embodiment an injection molding system is provided, wherein:

the controller includes instructions that, in response to a signal received from the interface of a user selection of one of the plurality of icons, causes the user interface to display an entry device for selection of a parameter value for the associated control function.

In one embodiment an injection molding system is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment an injection molding system is provided, wherein:

the controller includes instructions to the actuator to drive the valve pin at a travel velocity in a range from zero to a maximum velocity and including one or more intermediate travel velocities between zero and the maximum.

In one embodiment an injection molding system is provided, wherein:

the controller includes instructions to the actuator to drive the valve pin to a predetermined hold and pack position between the open and closed positions.

In one embodiment a computer implemented method is provided for initiating flow of fluid material through a fluid flow passage of a valve and into one or more gates of a mold cavity during an injection molding cycle, wherein a controller includes a set of instructions that define a set of preselected control functions and event triggers for generating and transmitting instructions to an actuator to drive a valve pin between open, closed and intermediate positions that restricts flow of the fluid material through the gate to less than a maximum flow during the course of an injection molding cycle, the method comprising:

providing a graphical computer user interface that displays a plurality of user selectable virtual icons each corresponding to a preselected valve pin control function that controls, via control of the actuator, positioning or controlled driving of the valve pin during the course of the injection cycle between the open, closed and intermediate positions, the virtual icons including:

trigger icons each representing a different preselected event to trigger a subsequent movement of the valve pin, move-to icons each representing a different preselected control function that initiates an associated movement of the valve pin, wherein the move-to icons include one or more preset icons each virtually representing a preselected plurality of control functions that define a sequence of associated movements of the valve pin, the controller communicating with the user interface and further including a set of instructions that enable the user, via the user interface, to select and arrange a plurality of the virtual icons in a sequence that virtually represents a sequence of control functions for the actuator to implement during the course of an injection cycle, wherein the method includes steps of:

a user selecting via the interface a trigger icon and arranging the selected trigger icon as a first icon of the sequence, a user selecting via the interface a move-to icon and arranging the selected trigger icon as a second icon of the sequence, wherein the user may select and arrange additional icons to complete the sequence.

In one embodiment a method is provided, further including:

generating a simulated pin profile according to the sequence and displaying the simulated pin profile via the interface to a user.

In one embodiment a method is provided, further including:

driving the valve pin over the course of an injection cycle according to the sequence.

In one embodiment a method is provided, further including:

monitoring the valve pin position over the course of the injection cycle and generating an actual pin profile, displaying the actual pin profile via the interface to the user.

In one embodiment a method is provided, further including:

displaying via the interface a user entry device that prompts the user to enter a parameter value further defining the associated control function.

In one embodiment a method is provided, further including:

receiving and displaying via the interface a parameter value entered by the user with the selected icon defining the associate control function.

In one embodiment a method is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment a method is provided, wherein:

the user interface accepts a user input for selection among one or more of storing, copying and editing the sequence.

In one embodiment a method is provided, further including:

displaying via the interface a velocity control icon virtually representing a preselected control function to set a travel velocity for an associated movement of the valve pin.

In one embodiment a method is provided, further including:

displaying via the interface a timer icon virtually representing a preselected control function to set a delay time before initiating an associated movement of the valve pin.

In one embodiment a method is provided, further including:

displaying via the interface one or more sensitivity icons each virtually representing a preselected control function defining a control sensitivity for an associated movement of the valve pin.

In one embodiment a method is provided, wherein:

displaying via the interface a canvas space onto which the user moves and arranges the selected virtual icons into the sequence that virtually represents the sequence of control functions for the actuator to implement during the course of an injection cycle.

In one embodiment a method is provided, wherein:

the move-to icons include icons representing control functions for an associated movement toward the gate open position, toward the gate closed position and toward a user selectable intermediate position.

In one embodiment a method is provided, wherein:

the move-to icons include a pressure profile icon representing control functions for an associated sequence of pin movements to follow a pressure profile over time.

In one embodiment a method is provided, wherein:

the controller instructs the actuator to drive the valve pin at a travel velocity in a range from zero to a maximum velocity and including one or more intermediate travel velocities between zero and the maximum.

In one embodiment a method is provided, wherein:

the controller instructs the actuator to drive the valve pin to a predetermined hold and pack position between the open and closed positions.

Fifth Claim Set

In one embodiment injection molding system for initiating flow of fluid material into one or more gates of a mold cavity during an injection molding cycle is provided, the system comprising:

a valve comprising a fluid flow passage for delivering fluid material to a gate of a mold cavity, and an actuator that drives a valve pin between a downstream gate closed position and an upstream gate open position;

the system further including a valve pin control system comprised of:

a controller including a set of instructions that define a set of preselected control functions and event triggers for generating and transmitting instructions to the actuator of the valve to drive the valve pin between the open and closed positions during the course of an injection molding cycle;

a graphical computer user interface that displays a plurality of user selectable virtual icons each corresponding to a preselected valve pin control function that controls, via control of the actuator, positioning or controlled driving of the valve pin during the course of the injection cycle between the open and closed positions, the virtual icons including:

trigger icons each representing a different preselected event to trigger a subsequent movement of the valve pin, move-to icons each representing a different preselected control function that initiates an associated movement of the valve pin:

to the open position and the closed position, between the open and closed positions, the controller communicating with the user interface and further including a set of instructions that enable the user, via the user interface, to select and arrange a plurality of the virtual icons in a sequence that virtually represents a sequence of control functions for the actuator to implement during the course of an injection cycle.

In one embodiment an injection molding system is provided, further including:

a velocity control icon virtually representing a preselected control function to set a travel velocity for an associated movement of the valve pin.

In one embodiment an injection molding system is provided, further including:

a timer icon virtually representing a preselected control function to set a delay time before initiating an associated movement of the valve pin.

In one embodiment an injection molding system is provided, further including:

one or more preset icons each virtually representing a preselected plurality of control functions that define a sequence of associated movements of the valve pin.

In one embodiment an injection molding system is provided, further including:

one or more sensitivity icons each virtually representing a preselected control function defining a control sensitivity for an associated movement of the valve pin.

In one embodiment an injection molding system is provided, wherein:

the user interface includes a canvas space onto which the user moves and arranges the selected virtual icons into the sequence that virtually represents the sequence of control functions for the actuator to implement during the course of an injection cycle.

In one embodiment an injection molding system is provided, wherein:

the user interface accepts user input for selection among one or more of storing, copying and editing the sequence.

In one embodiment an injection molding system is provided, wherein:

in response to user selection of one of the icons, the user interface prompts the user to enter a parameter further defining the associated control function.

In one embodiment an injection molding system is provided, wherein:

the move-to icons include icons representing control functions for an associated movement toward the gate open position, toward the gate closed position and toward a user selectable intermediate position.

In one embodiment an injection molding system is provided, wherein:

the move-to icons include a pressure profile icon representing control functions for an associated sequence of pin movements to follow a pressure profile over time.

In one embodiment an injection molding system is provided, wherein:

the controller includes instructions that, in response to a signal received from the interface of a user selection of one of the plurality of icons, causes the user interface to display an entry device for selection of a parameter value for the associated control function.

In one embodiment an injection molding system is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment an injection molding system is provided, wherein:

the controller includes instructions to the actuator to drive the valve pin at a travel velocity in a range from zero to a maximum velocity and including one or more intermediate travel velocities between zero and the maximum.

In one embodiment an injection molding system is provided, wherein:

the controller includes instructions to the actuator to drive the valve pin to a predetermined hold and pack position between the open and closed positions.

In one embodiment a computer implemented method is provided for initiating flow of fluid material through a fluid flow passage of a valve and into one or more gates of a mold cavity during an injection molding cycle, wherein a controller includes a set of instructions that define a set of preselected control functions and event triggers for generating and transmitting instructions to an actuator to drive a valve pin between open and closed positions that restricts flow of the fluid material through the gate to less than a maximum flow during the course of an injection molding cycle, the method comprising:

providing a graphical computer user interface that displays a plurality of user selectable virtual icons each corresponding to a preselected valve pin control function that controls, via control of the actuator, positioning or controlled driving of the valve pin during the course of the injection cycle between the open and closed positions, the virtual icons including:

trigger icons each representing a different preselected event to trigger a subsequent movement of the valve pin, move-to icons each representing a different preselected control function that initiates an associated movement of the valve pin:

a) to the open position and the closed position, the controller communicating with the user interface and further including a set of instructions that enable the user, via the user interface, to select and arrange a plurality of the virtual icons in a sequence that virtually represents a sequence of control functions for the actuator to implement during the course of an injection cycle, wherein the method includes steps of:

a user selecting via the interface a trigger icon and arranging the selected trigger icon as a first icon of the sequence, a user selecting via the interface a move-to icon and arranging the selected trigger icon as a second icon of the sequence, wherein the user may select and arrange additional icons to complete the sequence.

In one embodiment a method is provided, further including:

generating a simulated pin profile according to the sequence and displaying the simulated pin profile via the interface to a user.

In one embodiment a method is provided, further including:

driving the valve pin over the course of an injection cycle according to the sequence.

In one embodiment a method is provided, further including:

monitoring the valve pin position over the course of the injection cycle and generating an actual pin profile, displaying the actual pin profile via the interface to the user.

In one embodiment a method is provided, further including:

displaying via the interface a user entry device that prompts the user to enter a parameter value further defining the associated control function.

In one embodiment a method is provided, further including:

receiving and displaying via the interface a parameter value entered by the user with the selected icon defining the associate control function.

In one embodiment a method is provided, wherein:

the entry device prompts the user to enter a parameter value for one or more of pin velocity, pressure of the fluid material in the flow passage or mold cavity, an intermediate pin position between the open and closed positions, control sensitivity, and time delay.

In one embodiment a method is provided, wherein:

the user interface accepts a user input for selection among one or more of storing, copying and editing the sequence.

In one embodiment a method is provided, further including:

displaying via the interface a velocity control icon virtually representing a preselected control function to set a travel velocity for an associated movement of the valve pin.

In one embodiment a method is provided, further including:

displaying via the interface a timer icon virtually representing a preselected control function to set a delay time before initiating an associated movement of the valve pin.

In one embodiment a method is provided, further including:

displaying via the interface one or more preset icons each virtually representing a preselected plurality of control functions that define a sequence of associated movements of the valve pin.

In one embodiment a method is provided, further including:

displaying via the interface one or more sensitivity icons each virtually representing a preselected control function defining a control sensitivity for an associated movement of the valve pin.

In one embodiment a method is provided, wherein:

displaying via the interface a canvas space onto which the user moves and arranges the selected virtual icons into the sequence that virtually represents the sequence of control functions for the actuator to implement during the course of an injection cycle.

In one embodiment a method is provided, wherein:

the move-to icons include icons representing control functions for an associated movement toward the gate open position, toward the gate closed position and toward a user selectable intermediate position.

In one embodiment a method is provided, wherein:

the move-to icons include a pressure profile icon representing control functions for an associated sequence of pin movements to follow a pressure profile over time.

In one embodiment a method is provided, wherein:

the controller instructs the actuator to drive the valve pin at a travel velocity in a range from zero to a maximum velocity and including one or more intermediate travel velocities between zero and the maximum.

In one embodiment a method is provided, wherein:

the controller instructs the actuator to drive the valve pin to a predetermined hold and pack position between the open and closed positions.

BRIEF DESCRIPTION OF THE DRAWINGS

The above and further advantages of the various embodiments of the invention may be better understood by referring to the following description in conjunction with the accompanying drawings in which:

FIG. 16 shows a selected preset icon, FIG. 17 shows the steps of parameter values for the various control functions of the sequence, FIG. 18 shows the final simulated trace according to the sequence, and FIG. 19 shows the simulated pin profile trace with an overlay of the actual pin profile trace;

DETAILED DESCRIPTION OF THE INVENTION

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

Figure 1:
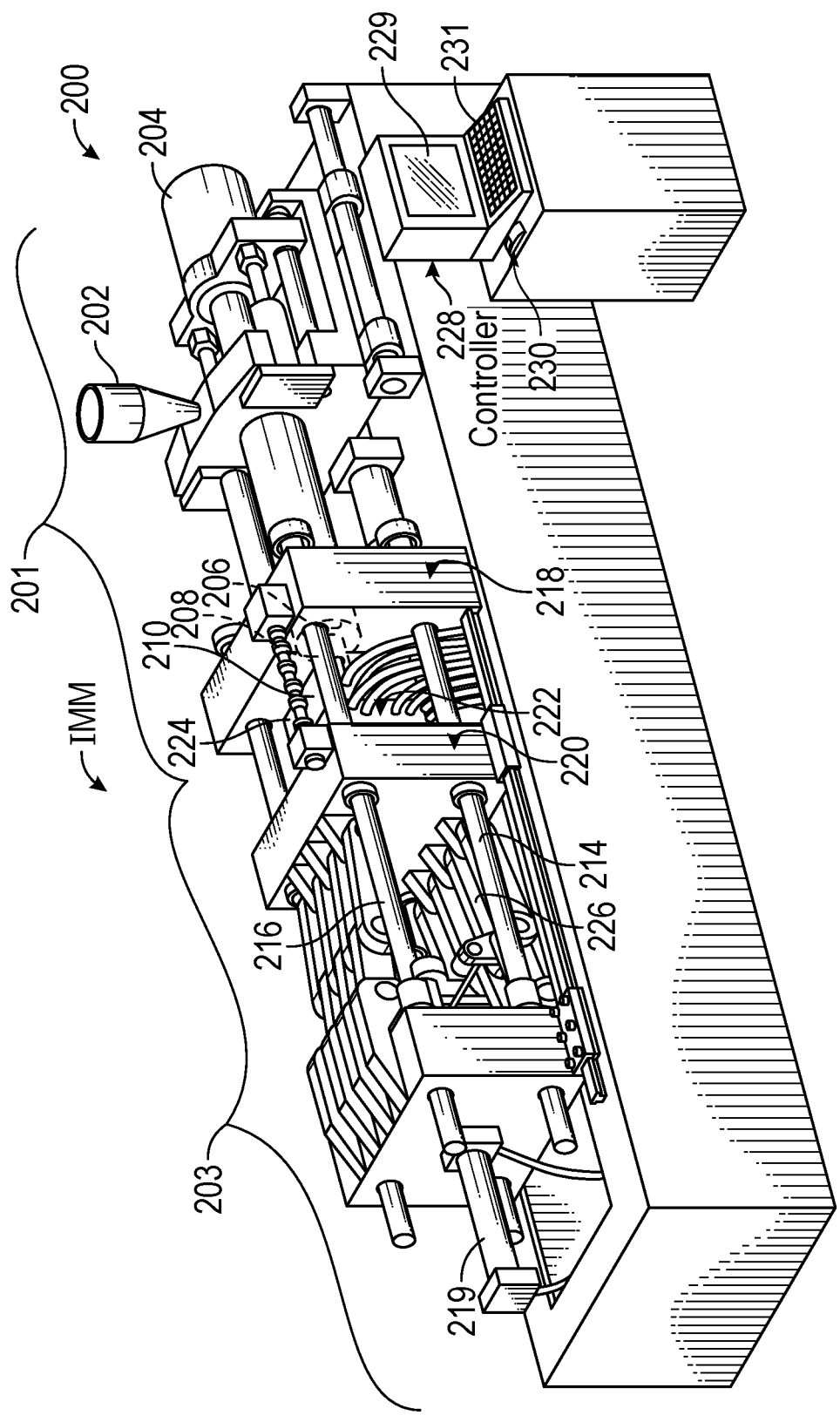
FIG. 1 is a perspective view of an injection molding machine.

FIG. 1 and the accompanying description provide an overview of one embodiment of an injection molding machine (IMM). FIGS. 21-27 and accompanying description provide a more detailed view and explanation of one embodiment of an IMM, control system and sequential multi-gate injection molding process.

Figure 2:
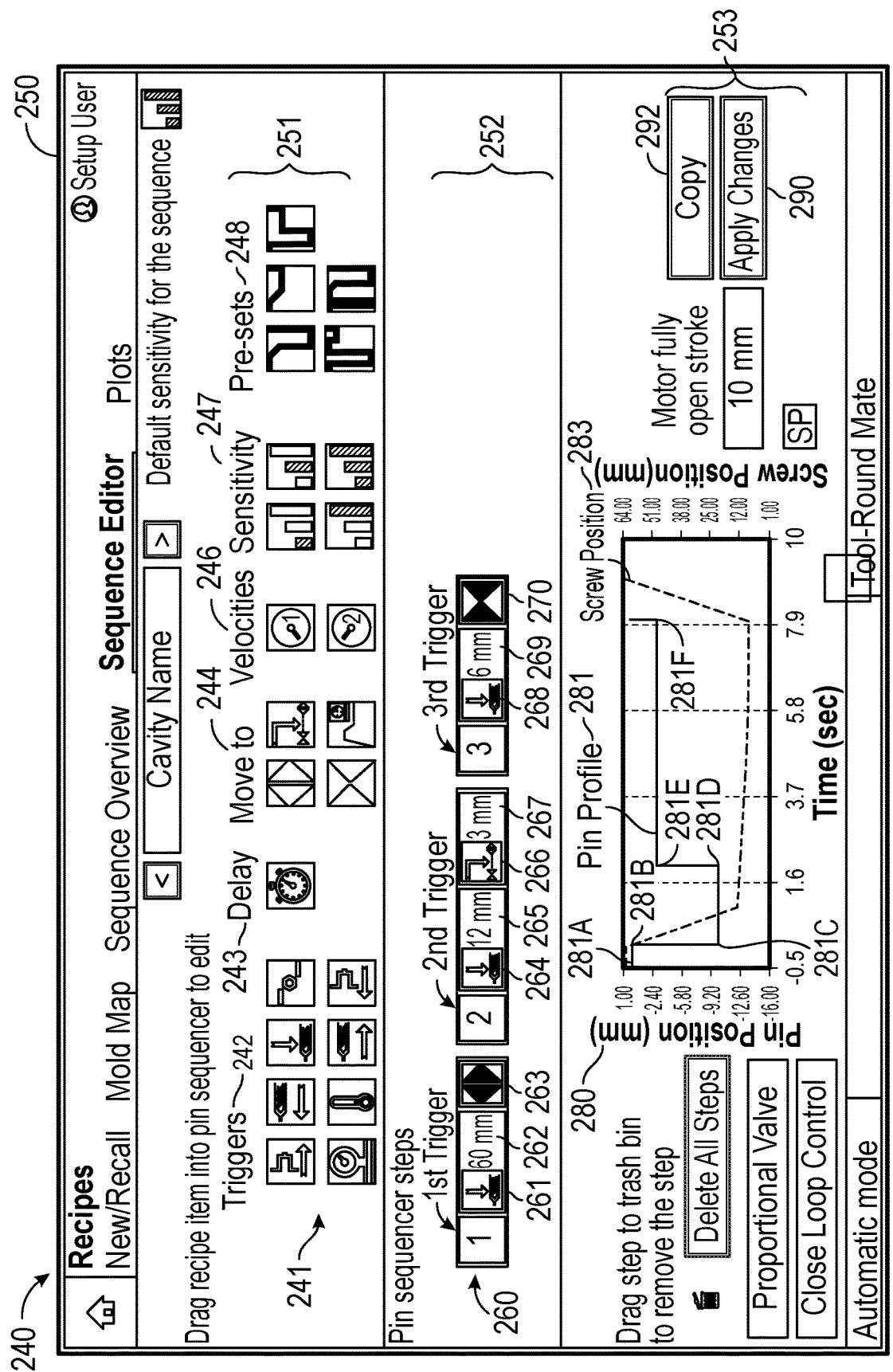
FIG. 2 is a screenshot of a graphical user interface according to one embodiment of the present invention, showing various groups of virtual icons, a sequence created from selected virtual icons arranged in a particular order, and an associated pin profile (a graph of pin position in millimeters (y axis) versus time in seconds (x axis) over the course of one injection cycle) resulting from control functions associated with the sequence.
Figure 3:
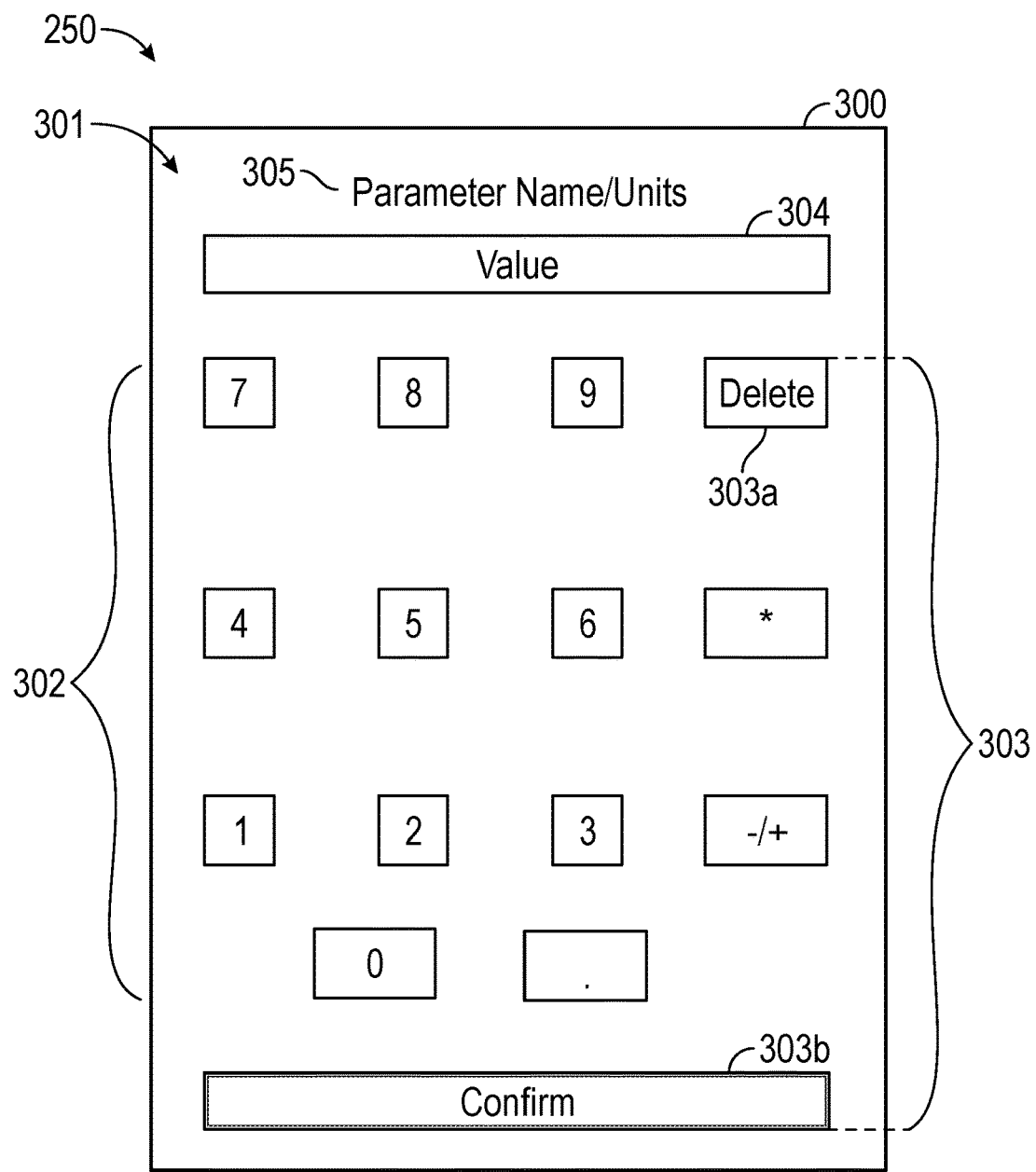
FIG. 3 is one embodiment of a screen entry device for user entry of a select parameter value associated with a selected virtual icon.
Figure 3:
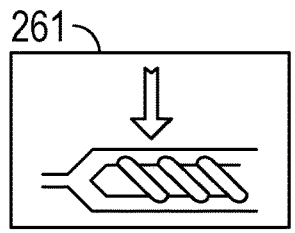
Figure 3:
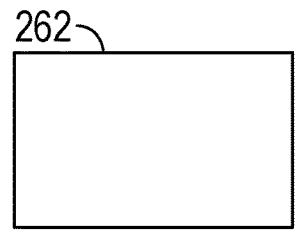
Figure 8:
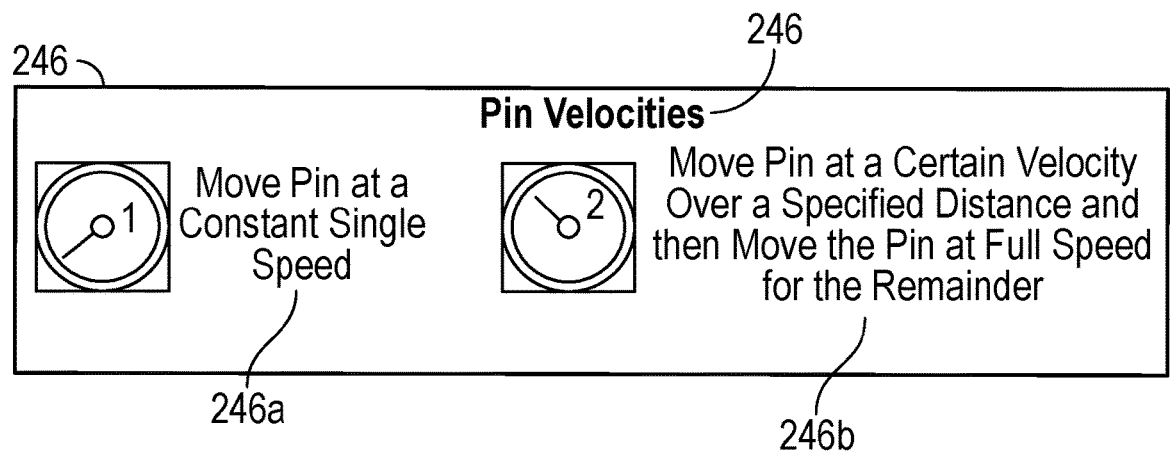
FIG. 8 illustrates a plurality of virtual pin velocity icons and their associated control functions.
Figure 9:
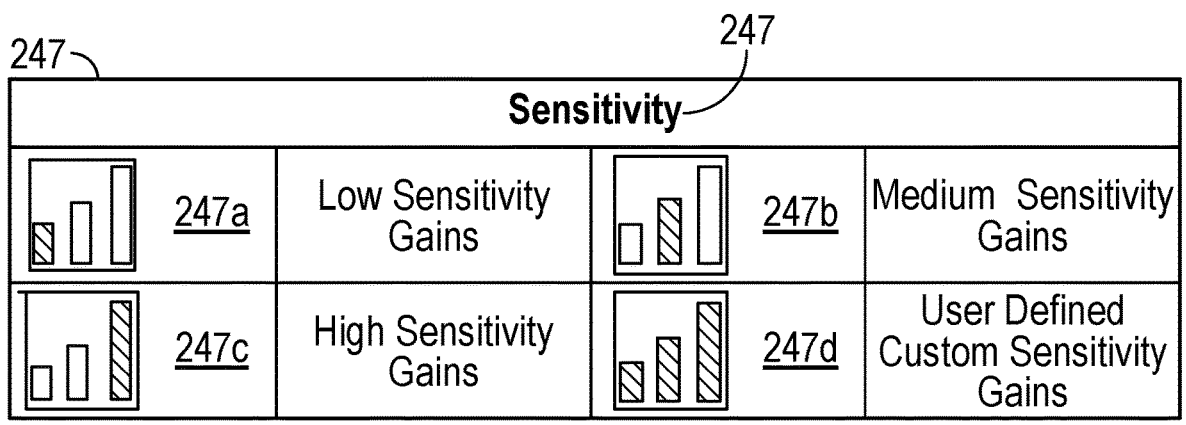
FIG. 9 illustrates a plurality of virtual sensitivity icon and their associated control functions.
Figure 10:
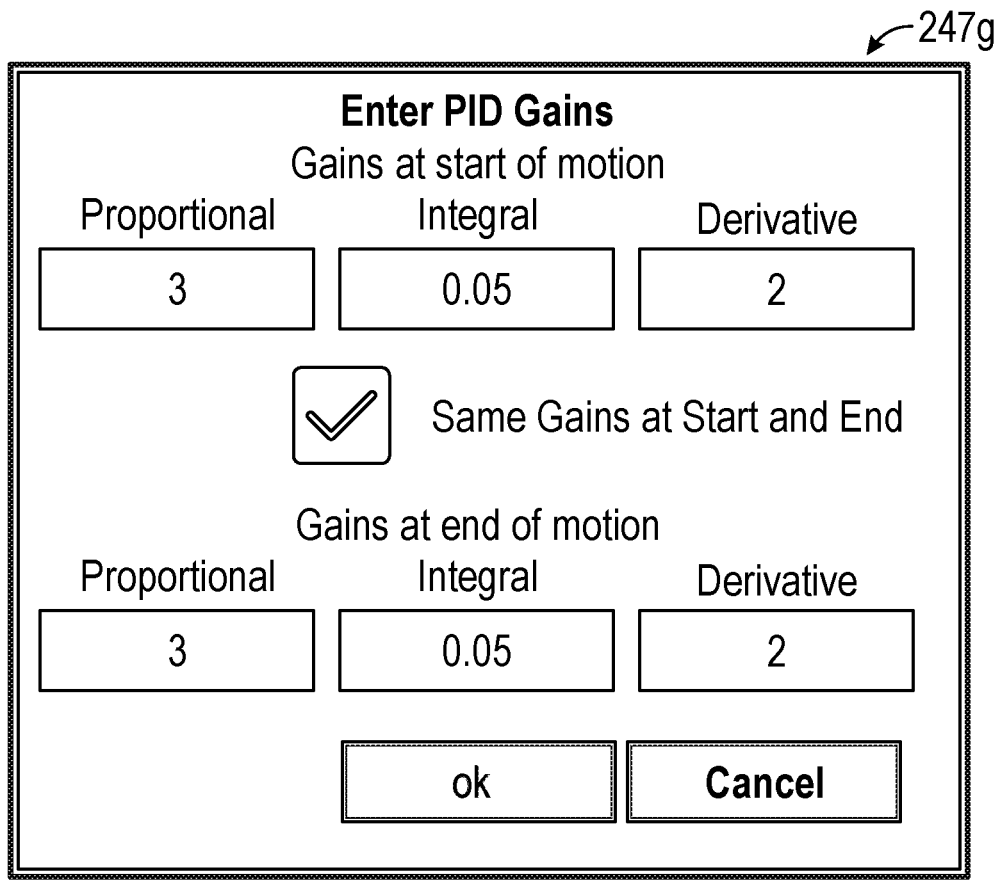
FIG. 10 illustrates a sensitivity editor.

FIGS. 2-10 and the accompanying description illustrate one embodiment of a graphical user interface and control system according to one embodiment of the invention enabling a user to select from and arrange a plurality of virtual icons into a user-defined virtual sequence that define associated actuator controlled pin movements over the course of an injection cycle. FIG. 2 shows a virtual sequence that was created by a user selecting and moving selected icons from the icon options across the top of the screen, onto a canvas space below, and a simulated profile of pin movement according to the user selected virtual sequence. FIG. 3 shows a virtual entry device for user entry of values of select parameters associated with an icon. FIGS. 4-9 show the various groups of virtual icons and their associated triggering events or control functions. FIG. 10 shows a sensitivity editor (a virtual entry device for user entry of values associated with an icon).

FIGS. 11-14 and the accompanying description illustrate examples of different pin profiles which a user may simulate by creating a virtual sequence.

FIGS. 15A-F and the accompanying description illustrate one example of the method steps of creating a sequence.

Figure 16:
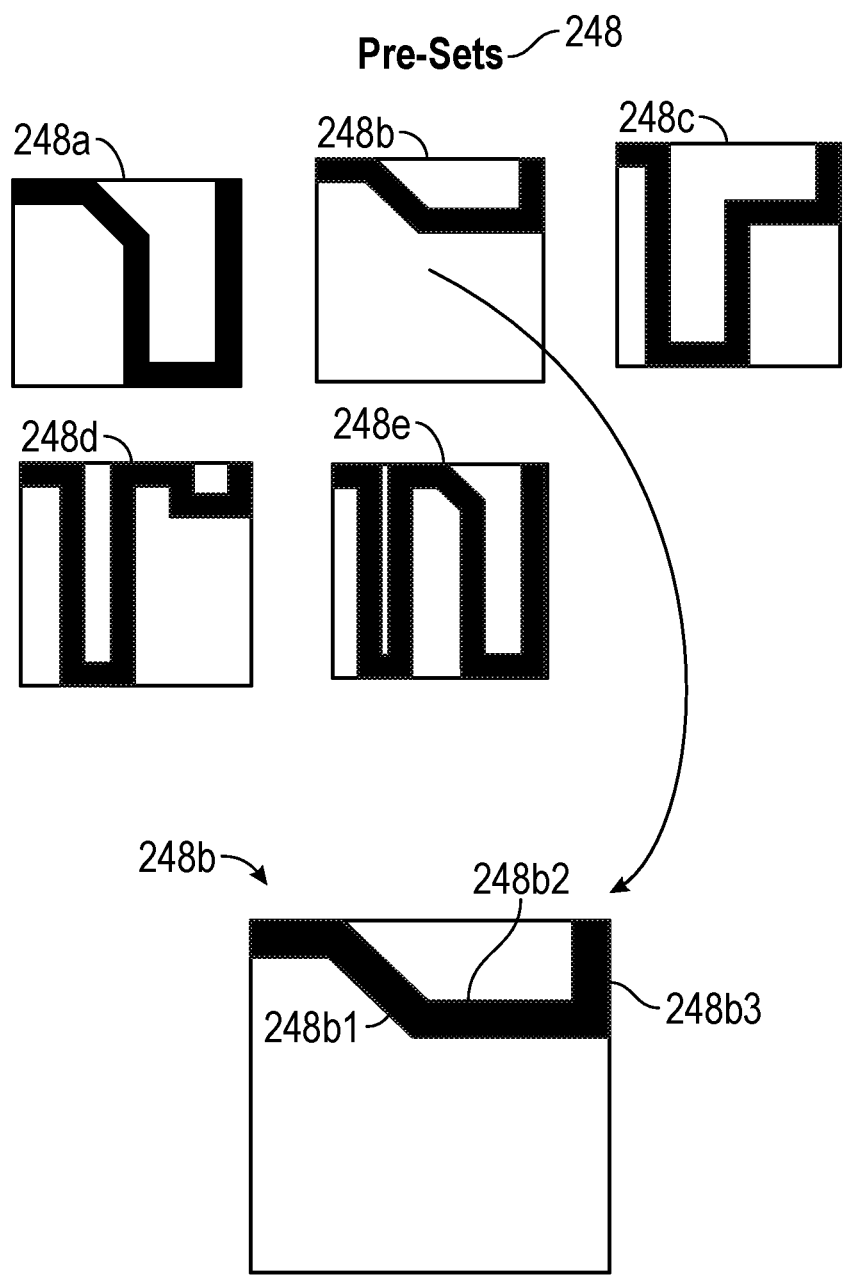
FIGS. 16 to 19 are a series of screenshots illustrating one example of the use of a virtual preset icon for establishing a sequence of triggers and pin movements over the course of an injection cycle, where.
Figure 17:
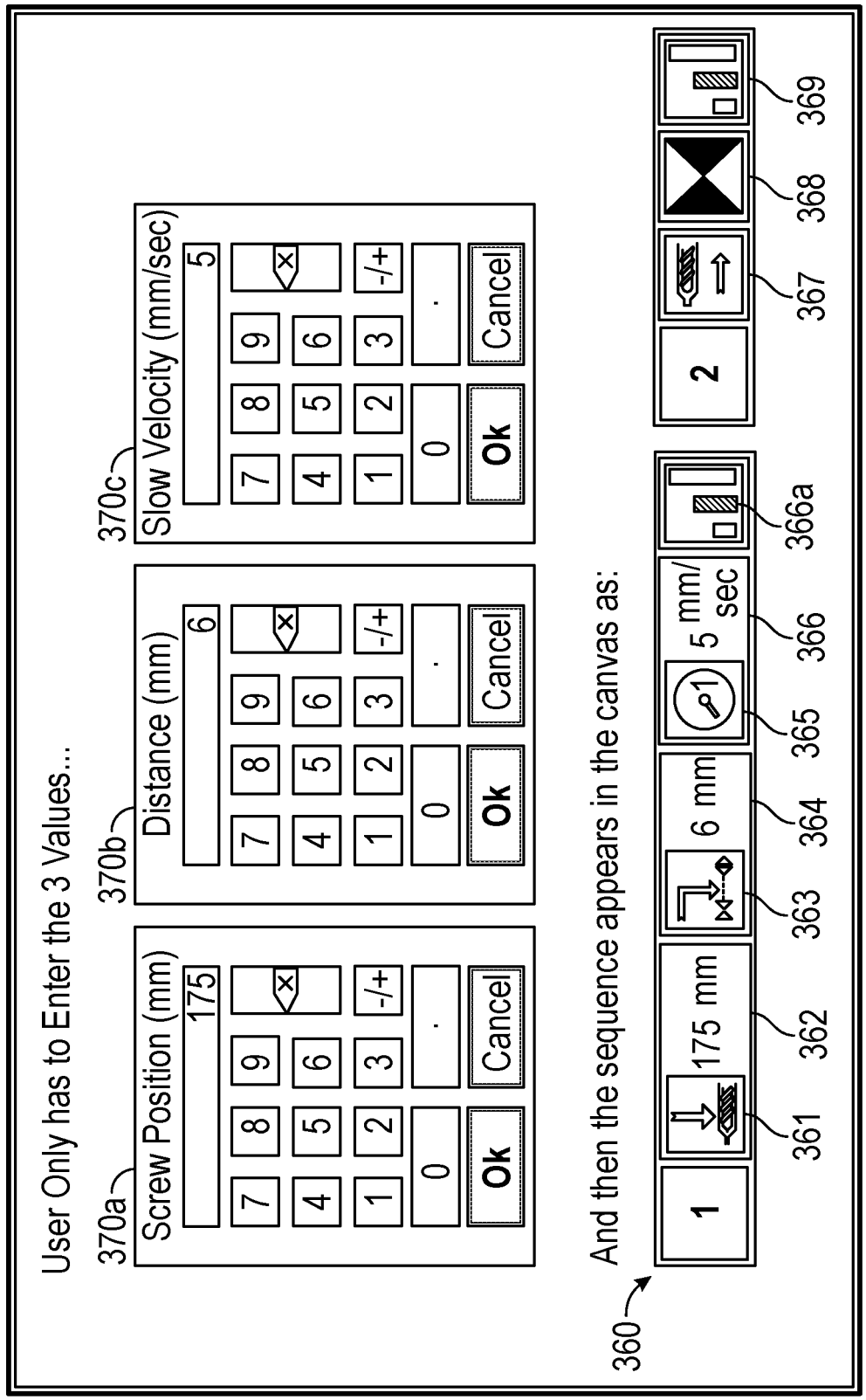
Figure 18:
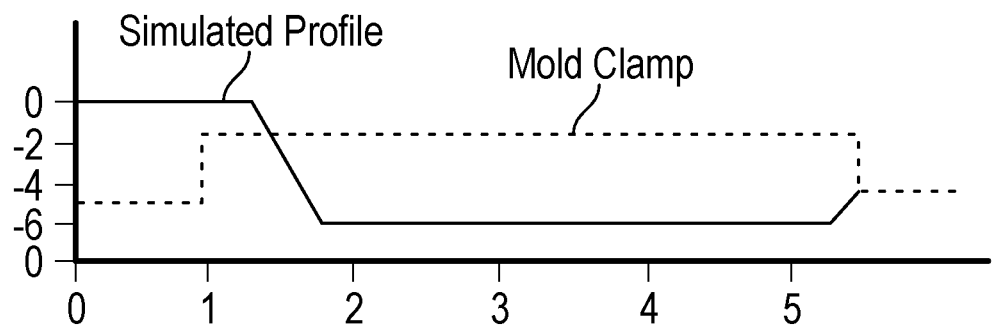
Figure 19:
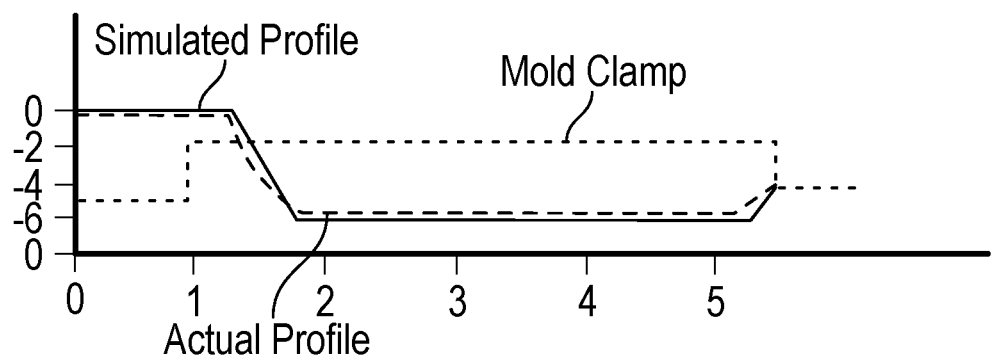

FIGS. 16-19 and the accompanying description illustrate one example of the method steps of creating a sequence utilizing a preset profile, wherein FIG. 18 shows the final simulated profile trace, and FIG. 19 shows an overlay of an actual trace and the simulated trace.

FIGS. 20A-E and the accompanying description illustrate one example of a graphical display with the selected sequences for multiple gates to a single mold in a sequential injection process. FIG. 20F and the accompanying description illustrate one example of a profile editor (a virtual entry device for user entry of values associated with a pressure profile icon).

FIGS. 21-27 and the accompanying description illustrate one embodiment of a control system and method requiring the sequential programming of multiple valve pins feeding multiple gates of a single mold cavity based on various triggering events over the course of the injection cycle, including sensors that detect system parameters during the course of the cycle that generate triggering events for subsequent pin movements, and which enable the system to detect an actual profile of valve pin movement for each of the valve pins over the course of the injection cycle. This is just one example of an injection molding system in which the graphical user interface and control system previously described can be used in accordance with setting and detecting the various triggering events and sequence of pin movements as desired in such a system.

Figure 28:
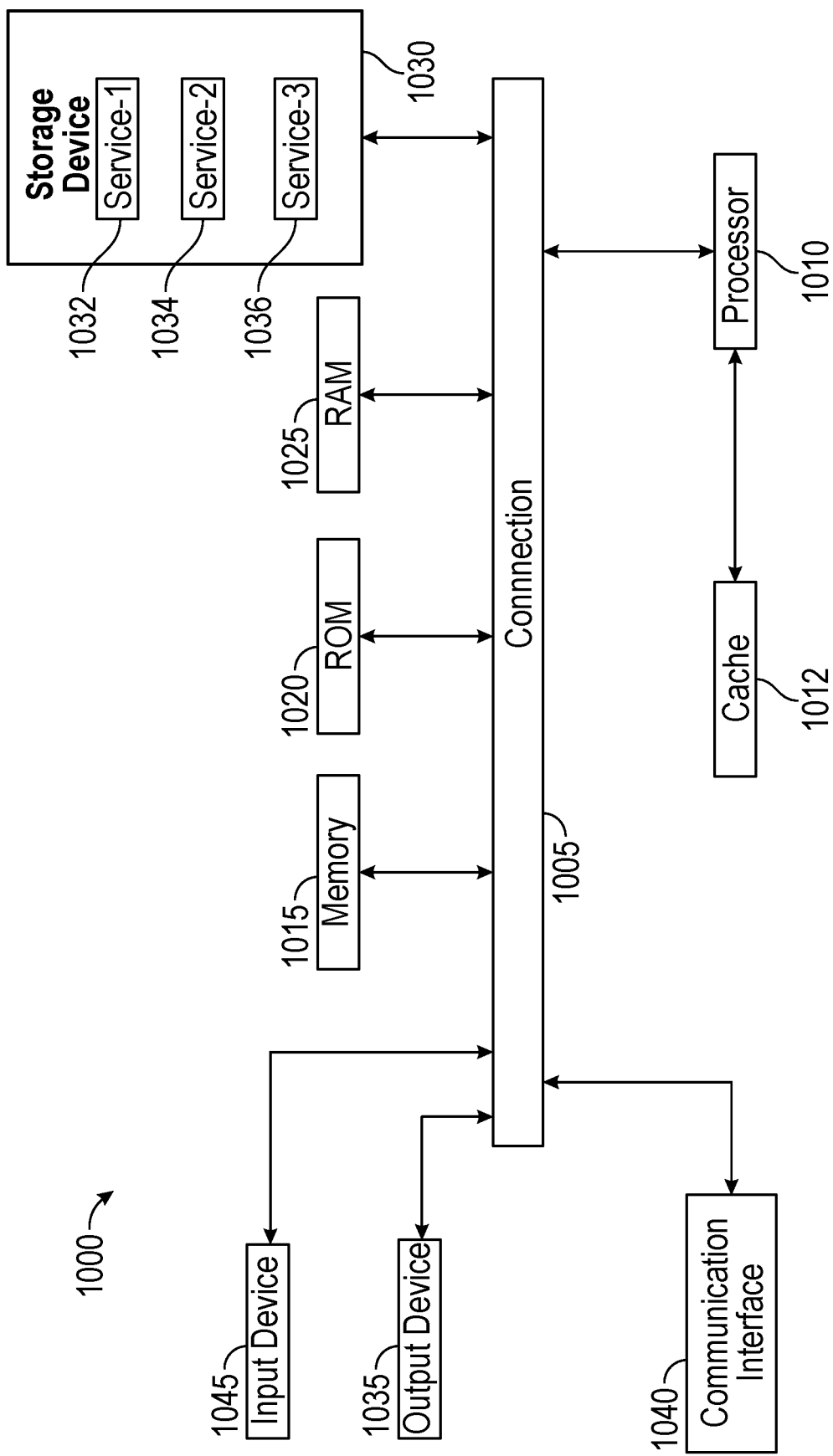
FIG. 28 illustrates an example computing device.

FIG. 28 illustrates one embodiment of a control system.

The detailed description below follows the above summary of various embodiments and includes section headers A. through H. for ease of reference.

A. Injection Molding Machine Overview

FIG. 1 provides a perspective view of an injection molding apparatus 200 comprised of an injection molding machine (referred to herein as "IMM") that may be used to automatically produce molded objects or articles by injecting an injection fluid (e.g., a heated polymer), at high pressure, into a mold, where the injection fluid cools and solidifies into a hardened object. The IMM may be generally divided into two portions: an injection unit 201 and a clamping unit 203.

The injection unit 201 includes a hopper 202, a screw motor 204 for driving a reciprocating screw (not shown), a barrel assembly 206, an injection nozzle 208, and a mold 210, which, generally speaking, is a type of heat exchanger that enables a fluid injected into the mold to solidify to a desired shape and dimensional details of a cavity defined within the mold 210. Thus, the injection unit 201 functions inject or otherwise provide an injection fluid into a mold 210

In particular, an injection fluid, such as plastic, is introduced from the hopper 202 and accumulated into the barrel assembly 206 in front and/or surrounding the reciprocating screw. The screw motor 206 drives the reciprocating screw and thereby forces the injection fluid through the barrel assembly 204 and into the injection nozzle 208. The injection nozzle 208 connects the barrel assembly 206 to the mold 210, thereby allowing the injection fluid to flow under pressure from the barrel assembly 206 through the injection nozzle 208 and into the cavity of the mold 210, where the injection fluid solidifies. A more detailed description of an injection process, including cross sectional views of the mold, actuator, and the screw/barrel assembly, are set forth under sub-heading G below and shown in FIGS. 20-27

The clamping unit 203 applies a clamping force to hold two halves of the mold 210 in proper alignment and thereby keep the mold 210 closed in a manner sufficient to resist the injection force and/or pressure generated during injection of injection fluid into the cavity of the mold 210. As illustrated, the clamping unit 203 includes one or more tie bars 214, 216, a stationary platen 218, a movable platen 220, and molding plates 222, 224 that house the mold 110 (i.e., the mold cavity).

A cylinder 219 may be actuated to close and open (i.e., clamp and unclamp) the mold 210 at appropriate times. Once the mold 210 is clamped, injection fluid is injected, at high pressure, into the cavity of the mold 210 using the injection unit 201. During such an injection process, a sufficiently strong clamping force is applied by the clamping unit 203 so that the mold 210 may not be opened (e.g., by the pressure of the injection). To amplify the clamping force, one or more toggle links 226 are used. The toggle links 226 are coupled to the movable platen 220, wherein the toggle links 226 are advanced or retracted by a ball screw rotationally driven by the cylinder 219 to generate a clamping force The IMM and system 200 may be automated and/or otherwise controlled by an IMM controller 228, which functions to automate and monitor various processes and process conditions for controlling the quality and consistency of injection-molded objects generated by the IMM. For example, the IMM controller 228 may generate drive signals that control the moving speed of the screw motor 206 and/or the injection speed of injection fluid into the cavity of the mold 210. Additionally, the IMM controller 228 may control the amount of pressure applied during injection into the cavity of the mold 210. The IMM controller 228 may include one or more processors that process software or other machine-readable instructions and may include a memory to store the software or other machine-readable instructions and data.

B. Graphical User Editor for Creating a Virtual Sequence of Controlled Valve Pin Movements FIG. 2 is a screenshot showing one embodiment of the graphical user interface 240 for creating and editing a virtual sequence 260 of control valve pin movements according to one embodiment of the invention. The interface and associated control system may be part of the controller 228 shown in FIG. 1, or a separate interface and control system. Typically the user interface will include a keyboard 231, mouse 230 (or other point and click device) and a display screen 229. Alternatively, a touch screen may be provided as the display for user entry and selection. As a further alternative, a user may utilize a mobile device (e.g., handheld device such as a smartphone, table or a laptop computer) with a display screen enabling a user to operate the controller remotely (e.g., via wireless communications).

The interface 240 includes a display screen 250 that makes available to a user, across an upper portion 251 of the screen, different groups of virtual icons 241 including: a) a plurality of trigger icons 242; b) a timer (delay) icon 243; c) a plurality of move-to icons 244; d) a plurality of pin velocity icons 246; e) a plurality of sensitivity icons 247; and f) a plurality of preset icons 248. The different specific events or control functions associated with each of these virtual icons will be described in greater detail below with reference to FIGS. 4-9.

Below the available icons, a further portion of the screen consists of a "canvas space" 252 to which a user moves and arranges a plurality of selected icons to create a virtual sequence 260, which represent a series (ordered sequence) of selected triggers and movements for controlling the positioning and/or rate of movement of a valve pin during the course of an injection cycle.

Below the virtual sequence 260, a further portion of the screen 253 contains a simulated pin position profile (and/or pressure profile and/or screw position and/or mold clamp profile) 280 that is produced by the triggers and control functions associated with the virtual icons of the sequence 260. The interface 240 thus provides the user with not only the ability to create an ordered sequence of triggers and pin movements (as represented by the virtual icons) but also to view in the same display screen a pin position (and/or pressure profile and/or screw position and/or mold clamp profile) associated with that sequence. As a further alternative described below, the interface also enable the user view an actual pin profile or pressure profile trace, e.g., for comparison with the simulated pin profile or pressure profile trace on the same screen.

In the example sequence 260 shown in FIG. 2, the first icon 261 of the sequence is a machine screw position trigger icon (from group 242) and it is selected by a user clicking on this same icon in group 242 and dragging the icon onto the canvas space 252 and releasing the icon 261 (e.g., releasing a pointer device 230 in FIG. 1 that enables a user to click on, drag and drop the icon onto another part of the screen). This selection will then cause the control system to prompt the user, via the user interface, to enter a parameter associated with the trigger, in this case a value for the screw position that constitutes the first trigger event 261. For example, a virtual screen entry window 300 as shown in FIG. 3, will pop up on the interface display screen 250, containing a virtual keypad 301 of number entry buttons 302 and associated control buttons 303 (e.g., confirm 303a, delete 303b), a display 304 of the user entered value, along with an identifier 305 (e.g., name) of the parameter and units thereof. After entry of the parameter value, e.g., 60 mm as the value of the screw position for the first trigger 261, the user hits confirm 303a and the virtual 262 icon is created and placed as the second element of the sequence 260.

The third icon of the sequence 260 is one of the move-to icons, here a move pin to a fully open position virtual icon 263. This third icon specifies a control function (move pin to the fully open position at maximum velocity) that is desired when the machine screw reaches the value (60 mm) specified in the second virtual icon 262.

The fourth icon 264 of the sequence 260 is selected to initialize a next (second) trigger event—here the fourth icon 264 being the same as the first selected trigger icon 261, namely the machine screw position icon, for which the user has entered (e.g., via the pop up window 300 of FIG. 3) a value of 12 mm, shown in the fifth icon 265. Next the user has been selected one of the move-to icons 244, here a move pin to a specific position between the fully open and fully closed position icon 266, as the sixth icon in the sequence, for which the interface then prompts (via entry device 300) the user to specify a pin position, here entered as 3 mm which becomes the next (seventh) icon 267. Finally, the user has selected as the eighth icon 268, a third triggering event (from the group 242), again a machine screw reaches the specified position icon, for which the user is prompted (via 300) to enter a specific parameter value, here 6 mm (the ninth icon 269) and for which the user specifies a move-to icon (from the group 244), here the move pin to the fully closed position icon as the final and tenth icon 270 of the sequence 260.

The lower portion 253 of the display screen 250 is a graph 280 of pin position in millimeters versus time in seconds illustrating the virtual sequence 260 selected by the user in 252. The left-hand vertical axis is pin position in millimeters and designates as "0" the pin in the fully closed position in the gate (no flow) while "10" millimeters designates the valve fully open position (maximum flow, without restriction, where the tip of the valve pin is positioned 10 mm above the gate). The pin profile 281 shows the pin starting in the 0 position (gate fully closed) at time equals zero (281A). At the first trigger event, namely when the machine screw reaches the 60 mm position (as specified by icons 261-262), the control system is instructed to send a signal to the actuator (see e.g., controller 60 of FIG. 21 that sends an output signal 9 to one or more of actuators 30A to 30E) to begin movement of an associated valve pin (26 in FIG. 21) upstream at a maximum velocity to the fully open position (here 10 mm). In the simulation (simulated pin profile 281), the pin moves at maximum velocity between points 281B and 281C until is reaches the fully open position at the 10 mm; this is achieved at under one second. Then at the next triggering event (specified by icons 264-265), namely when the screw position reaches 12 mm, the control system instructs the actuator to move the pin downstream at the maximum velocity to the 3 mm position (i.e., the pin moves downstream between 10 mm and 3 mm at maximum velocity as shown between points 281D and 281E on the pin profile 281). The pin is then held in this position until the third trigger event (specified by icons 268-270), namely when the machine screw reaches the 6 mm position, at which time the control system instructs the actuator to move the valve pin at the maximum velocity to the gate closed position (0 mm), whereby the pin returns to the 0 (gate fully closed) position at about 8 seconds. The simulated cycle then ends at about eight seconds and the mold clamp subsequently opens.

C. Display Icons and Associated Triggers or Control Functions

FIGS. 4-9 show the various groups of virtual icons and their associated triggering events or control functions.

Figures 4, 5:
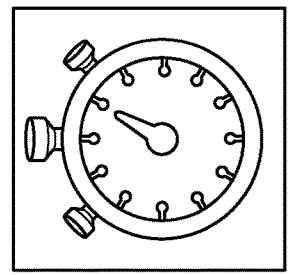
FIG. 4 illustrates a plurality of virtual trigger icons and their associated triggering events.
FIG. 5 illustrates a virtual timer icon for setting a time delay.

FIG. 4 shows the group of different trigger icons that each represent a different associated trigger event, including:
  mold closed icon 242a
  start of injection icon 242b
  switch over to pack icon 242g
  machine screw reaches specified position icon 242c
  pressure icon 242d
  temperature icon 242h
  mold opened icon 242e
  injection cycle ends and screw starts to recover icon 242f.

The control system (e.g., 228 in FIG. 1 or 60, 760 in FIGS. 21-27) includes various monitoring components (e.g., sensors, such as position, temperature or pressure sensors 40, 50, 790, 732 in FIGS. 21-27) that monitor the IMM for the above identified (or other) trigger events, and upon occurrence of the respective trigger event the monitoring component sends a signal (e.g., signal 795 in FIG. 27) to the controller (e.g., 760 in FIG. 27) indicative of the respective trigger event. The control system will then generate and send an instruction (e.g., 7210 in FIG. 27) to the actuator (e.g., 711 in FIG. 27) to initiate the pin movement associated with the next move-to icon 244 in the user defined sequence of icons.

FIG. 5 shows a virtual timer icon 243 that prompts the user to enter a time delay in seconds (e.g., via a virtual user entry window 300 as previously described with respect to FIG. 3) after the trigger event occurs for initiating the control function associated with the next icon in the user defined sequence of icons.

Figures 6, 7:
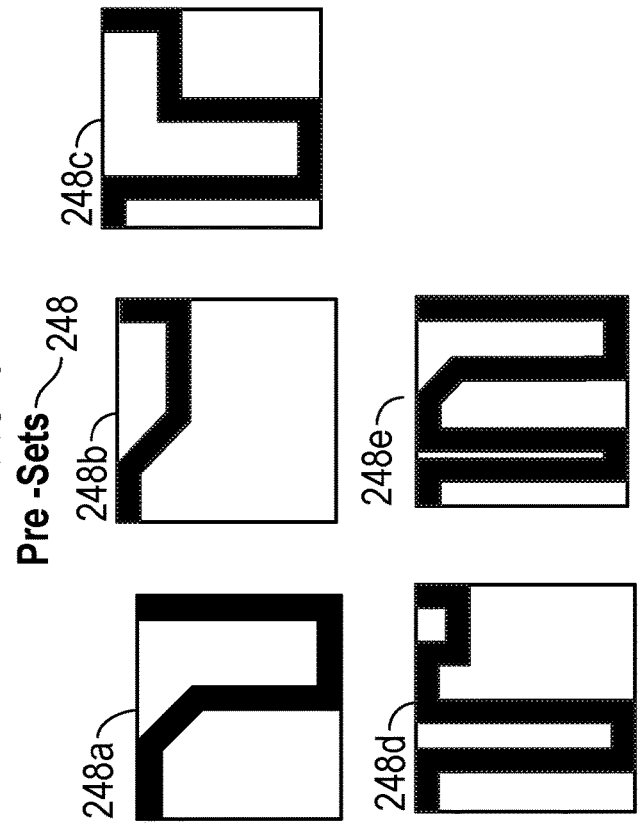
FIG. 6 illustrates a plurality of virtual move—to icons and their associated control functions.
FIG. 7 illustrates a plurality of virtual preset icons and their associated pin profiles.

FIG. 6 shows a group of move-to virtual icons 244 that each represent an associated control function for moving the pin in accordance with the associated control function as follows:
  move pin to fully opened position icon 244a
  move pin to specific position between fully opened and fully closed positions icon 244c
  move pin to fully closed position icon 244b
  move pin to maintain a desired pressure profile 244d.

FIG. 7 shows a group of preset icons 248a-248e that each define a different sequence of control functions to cause the pin to follow an associated pin position profile over time during the course of an injection cycle. The preset icons 248 can be used to automate the entry of a predetermined series of control functions at designated trigger times (i.e., establish a sequence of icons), as discussed further below under section F.

FIG. 8 shows a group of pin velocity icons 246 that each represent an associated control function for moving the pin in accordance with the associated control function to achieve a desired pin velocity respectively:

move pin at a constant single speed icon 246a move pin at a specified velocity over a specified distance and then moved the pin at full speed for the remainder of the movement 246b.

Figure 27:
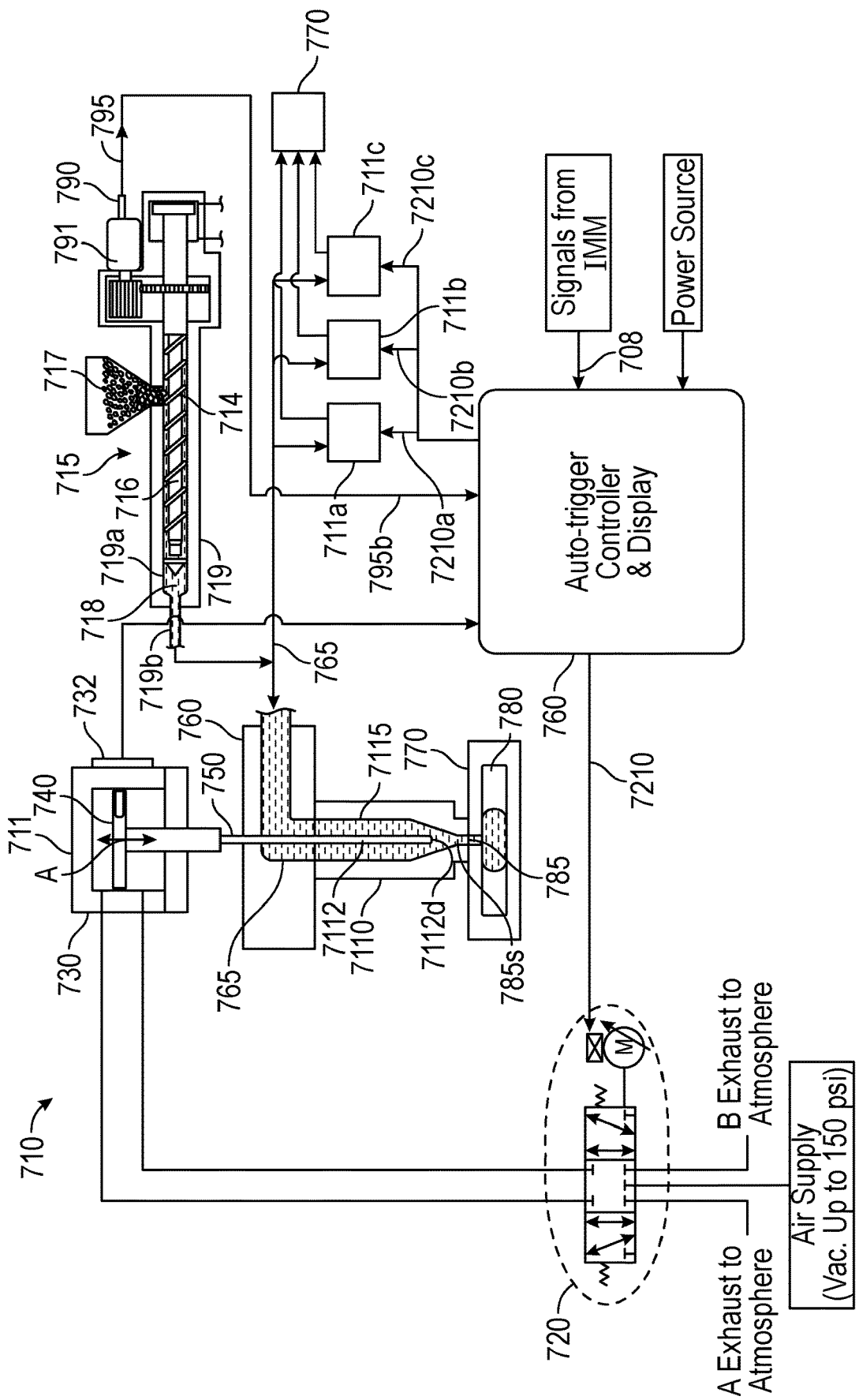
FIG. 27 is a schematic view of an apparatus for implementing the method of FIG. 26.

FIG. 9 shows a group of sensitivity icons 247 that each represent an associated control function (247a low sensitivity gains, 247b medium sensitivity gains, 247c high sensitivity gains, and 247d user defined custom sensitivity gains) for adjusting the sensitivity, e.g. the sensitivity of how precisely a closed loop control, between an actuator 730 and fluid flow control valve 720 in FIG. 27) will be processed by the controller, here showing low, medium and high sensitivity icons. FIG. 10 illustrates a user entry device 247g on the interface 250 for user entry to customize the sensitivity gain during the selected pin motion.

D. Examples of Pin Profiles

Figure 11:
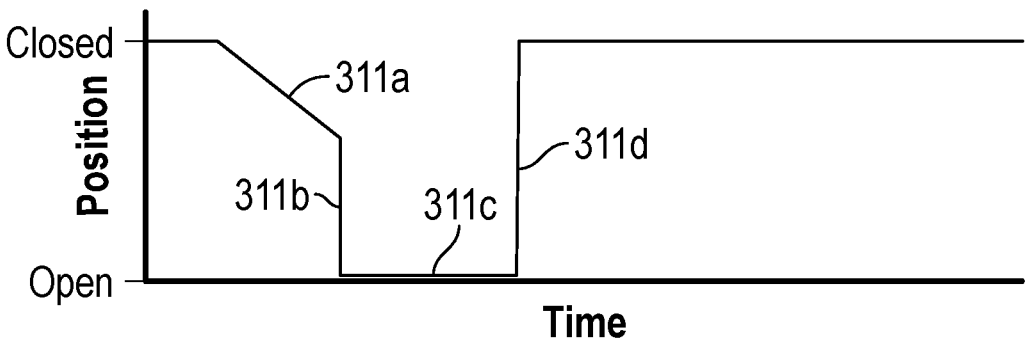
FIGS. 11-14 illustrate a plurality of different pin position profiles.
Figure 12:
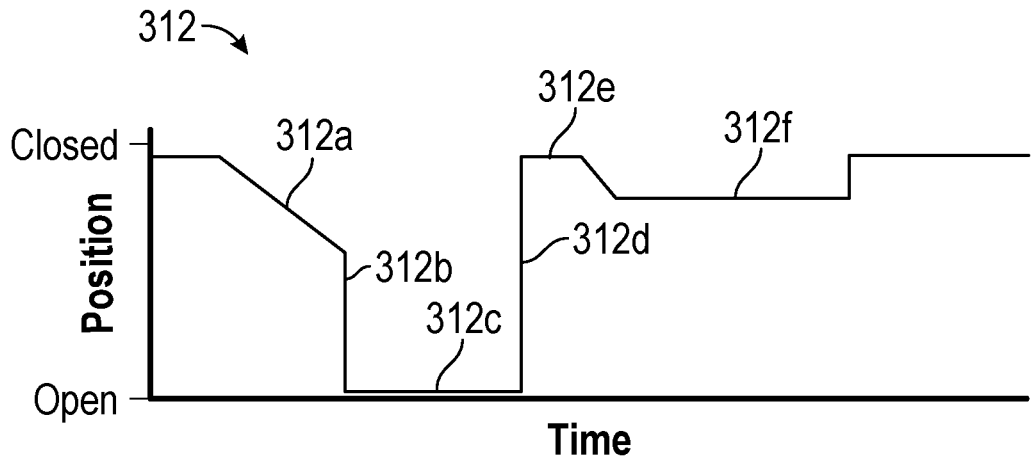
Figure 13:
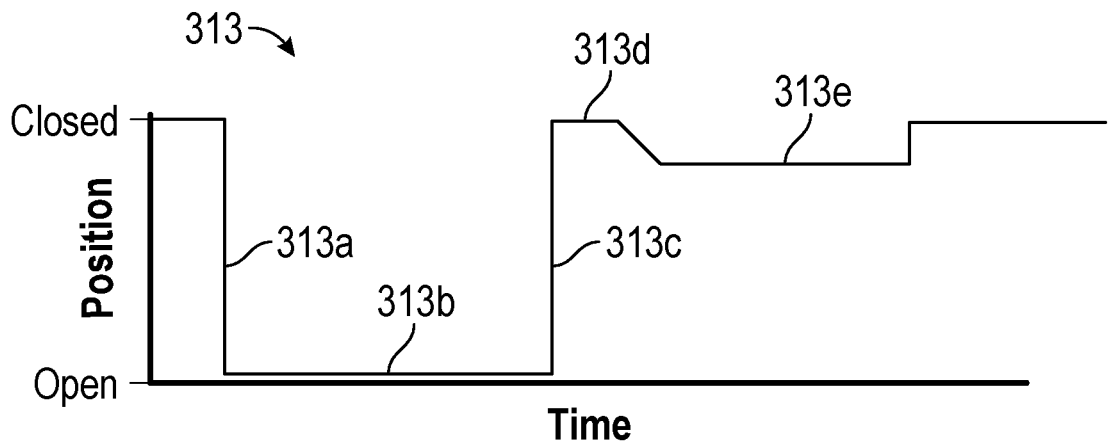
Figure 14:
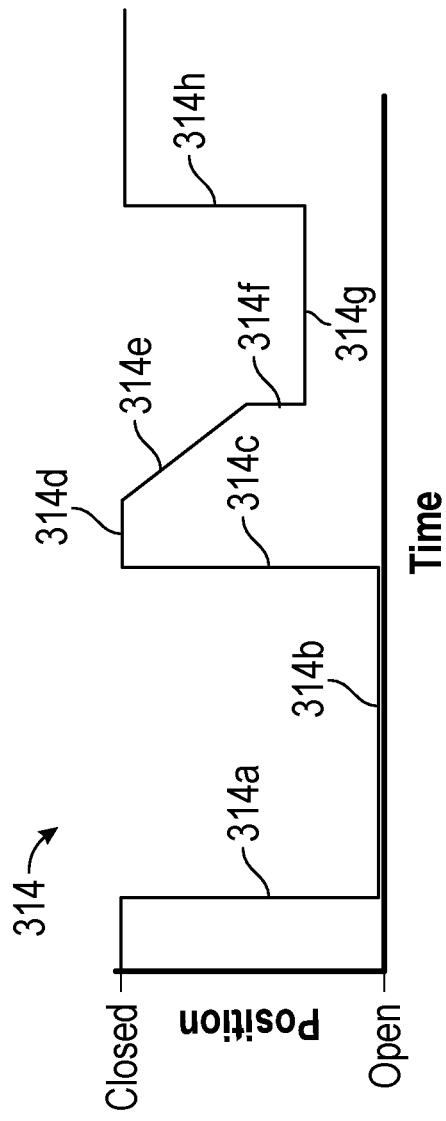

FIGS. 11-14 illustrate various simulated pin profiles 311-314 that may be created by a user with the virtual icons as previously described (see pin profile 280 in FIG. 2). Each pin profile is a graph of pin position versus time and corresponds to a predetermined set of control functions and event triggers during the course of an injection cycle. The pin profile 311 of FIG. 11 shows a reduced initial valve pin velocity for a defined portion 311a of the initial opening of the valve pin, then maximum speed to fully open position (or a defined intermediate position) 311c, held at fully open (or defined position) for some time 311c, before maximum speed 311d to fully closed. The pin profile 312 of FIG. 12 shows another sequence, similar to the FIG. 11, but adding before the end of the cycle an additional holding time 312e at a pin position close to zero where there is pressure applied and very restricted flow (e.g. a hold portion of a "pack and hold" cycle). FIG. 13 shows a pin profile 313 in which the pin is opened at maximum velocity to a fully open position 313a, held for a time at fully open 313b, and then moved at full velocity to the fully closed position 313c, held for a time 313d, and then an additional holding time 313e in a pin position at a pin position close to zero with very restricted flow (a hold portion of the pack and hold cycle). FIG. 14 shows a pin profile 314 similar to FIG. 13 in portions 314a through 313d, but then followed by a reduced velocity opening to an intermediate pin position 314e, and then maximum velocity opening to a second intermediate position 314f, held at the second position 314g, before closing at maximum velocity 314h for the end of the cycle.

E. Example—Establishing a Sequence of Virtual Icons

FIGS. 15A to 15F are a series of screenshots illustrating the method steps of one example of using the virtual icons to establish a sequence of triggers and controlled pin movements for a valve pin during the course of an injection cycle.

Figure 15A:
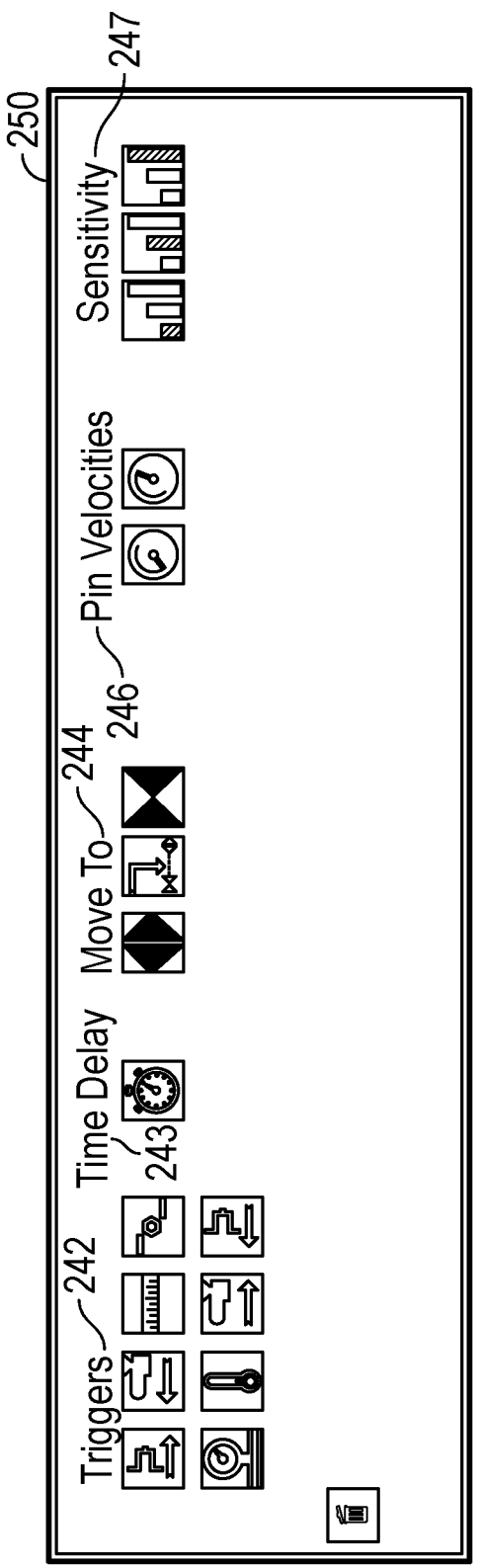
FIGS. 15A to 15F are a series of screenshots illustrating one example of using the individual trigger and move-to virtual icons to establish a sequence of triggers and pin movements for a valve pin during the course of an injection cycle.

FIG. 15A shows the available virtual icons across the top of the screen, and a blank canvas space below in which the user will create a desired sequence (similar to FIG. 2).

Figure 15B:
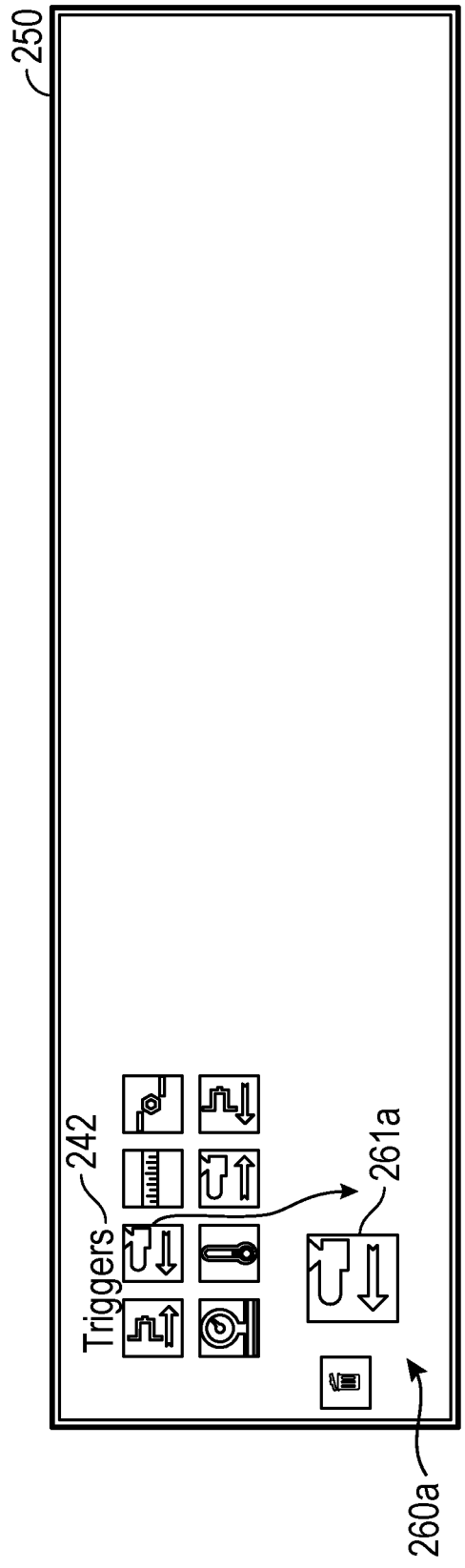

FIG. 15B shows a user selecting the start of injection trigger icon 242, by moving a pointing device and clicking on the icon, and then holding down the pointing device while dragging the icon down into the canvas space below; upon release of the pointing device, the start of injection trigger icon becomes the first icon 261a in the sequence 260a. The trigger may be detected by a sensor mounted on the screw barrel that detects the position of the screw over time, and sends a start of injection signal to the controller when that trigger event occurs. The controller will then generate and transmit to the actuator a control function associated with the next icon in the sequence (not yet selected) as described further below.

Figure 15C:
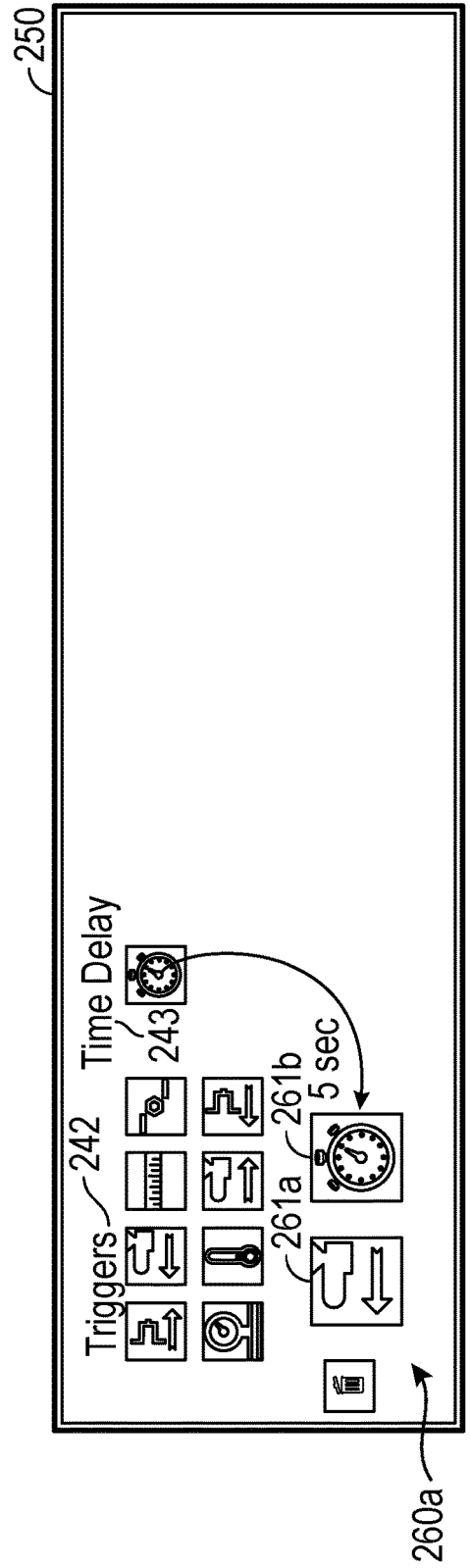

FIG. 15C shows the user selecting the timer icon 243 and dragging it into the canvas space below to become the second icon 261b, sequentially behind the start of injection icon 261a. The control system will prompt the user, via the display screen, to enter an amount of time in seconds (a specified delay time) that the control system should wait before transmitting to the actuator a control function associated with the next icon in the sequence. FIG. 15B shows the user has selected a five second delay time (the next icon 261c).

Figure 15D:
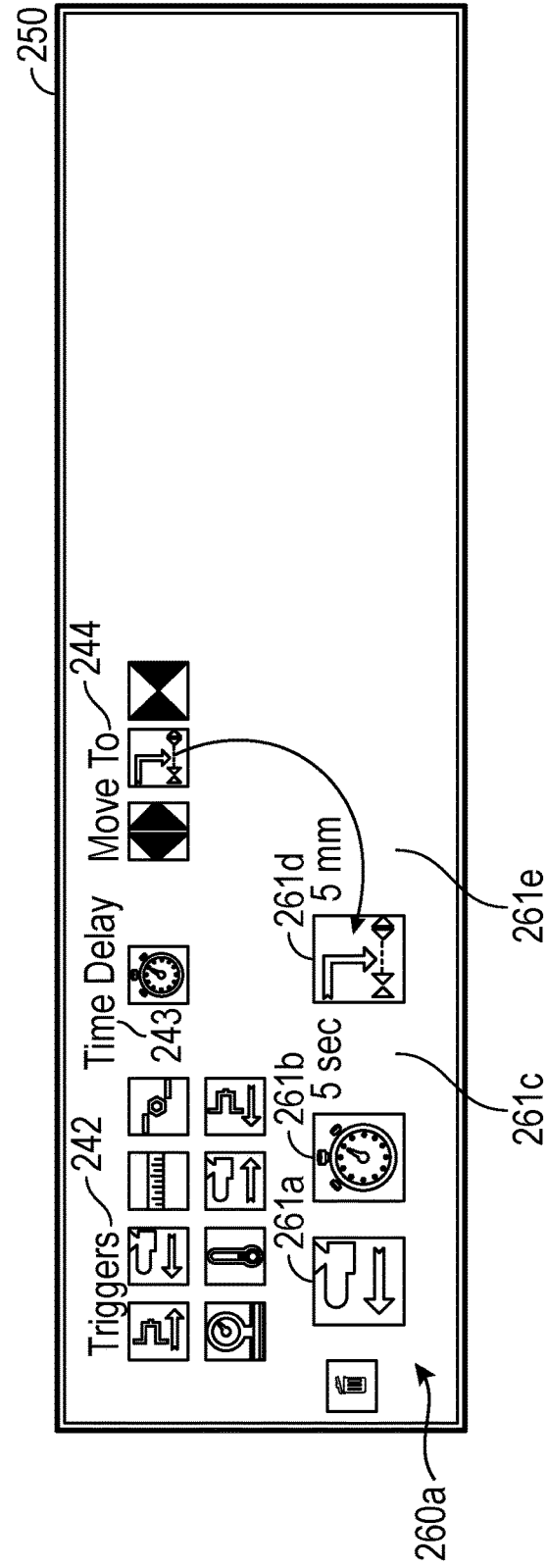

FIG. 15D shows the user selecting the move pin to specified position icon 244 and dragging the icon into the canvas space below to from the 4$^{th}$ icon 261d, sequentially behind the previously selected delay time 261c. The control system will prompt the user, via the display screen, to enter a distance in millimeters that is the specified position to which the pin should be moved. Here the user specifies that the pin will be moved to the 5 mm position from the gate (261e). The pin will remain in the 5 mm and position until another trigger is selected.

Figure 15E:
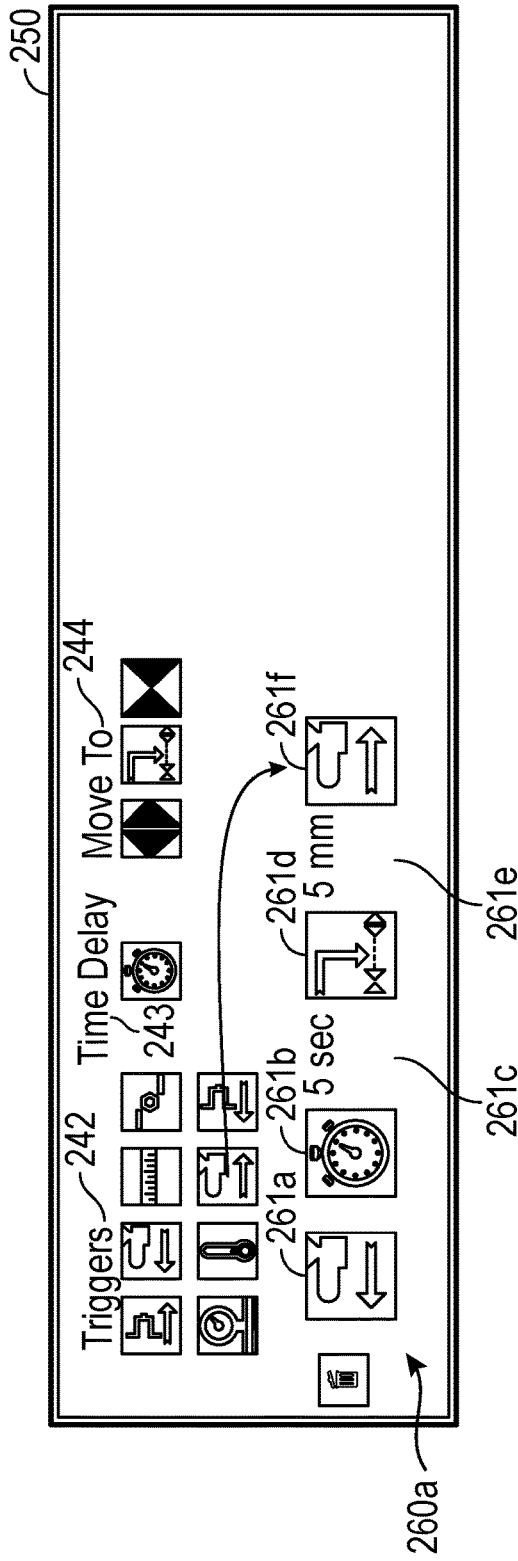

FIG. 15E shows the user selecting a second trigger icon 242, here the screw recovery trigger icon, which is then dragged into the canvas space below to become the sixth icon 261f, sequentially after the previously specified 5 mm icon 261e.

Figure 15F:
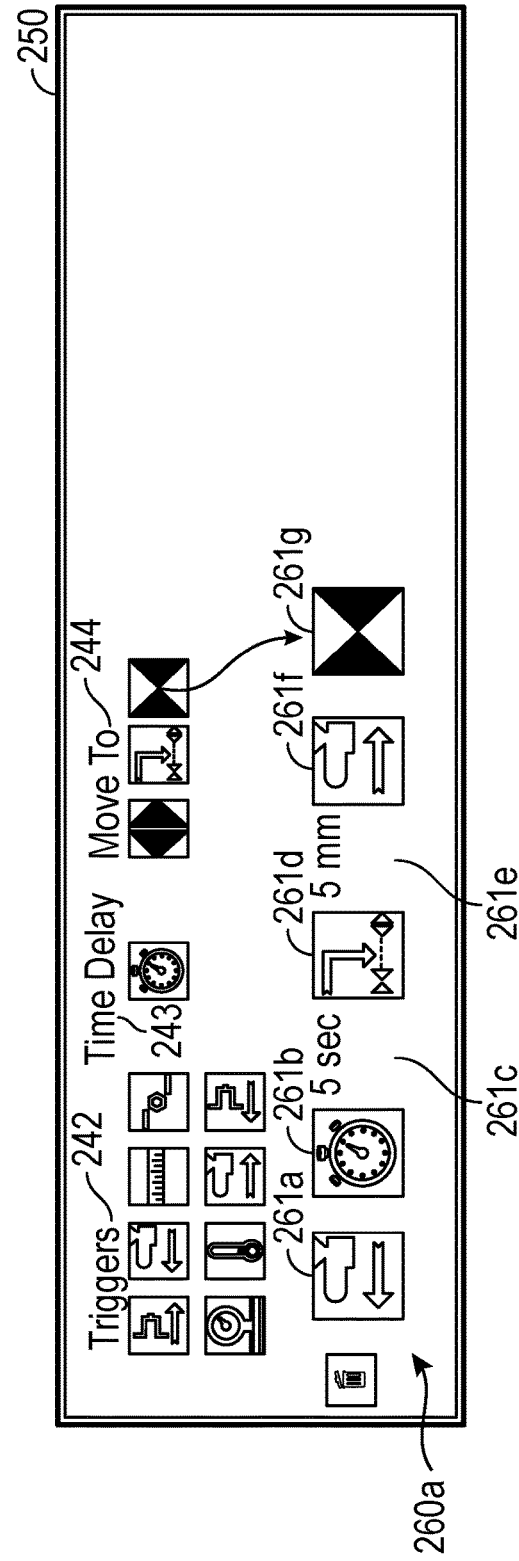

FIG. 15F shows the user selecting a second move-to icon 244, here the move pin fully closed icon, and dragging the icon into the canvas space below to become the seventh icon 261g, sequentially behind the previously selected moved to icon 261f. This time the user selects the move to fully closed position to close the pin and terminate the sequence.

The above process is just one example of a user selected virtual sequence. In various embodiments, the graphical editor includes a profile below the canvas based on the display screen, and a simulated position profile prevent distance over time) is generated and displayed in the profile space below the user-specified sequence. This enables the user to visualize the sequence of control functions that the user has specified, and intentionally edit the sequence to include one or more of the specified icons and associated parameters (e.g., time, speed or distance). The display screen includes user selectable icons and buttons to either save 290, edit 291 or copy 292 (as shown in FIG. 2) a sequence as desired. A sequence 260 may be copied and then used in a subsequent entry process for establishing the sequence for another gate, or saved, or copied and edited for more quickly creating a modified sequence for another gate (or a modified sequence for the same gate), thus providing a substantial time-savings to the user in not having to regenerate the entire sequence.

F. Example of Using a Preset Icon to Establish a Sequence

FIGS. 16-19 and the accompanying description illustrate one example of the method steps of creating a sequence utilizing a preset profile. FIG. 18 shows the final simulated profile trace, and FIG. 19 shows an overlay of an actual trace and the simulated trace.

FIG. 16 shows a user selected preset icon 248b that automatically generates a sequence of control functions generate a simulated position profile in accordance with the profile represented by the icon. Here the selected preset icon specifies a controlled initial opening of the valve pin at a reduced velocity 248b1, holding at a specified intermediate pin position over a substantial portion of the cycle 248b2, and then triggering a move to a fully closed position at maximum velocity 248b3 to end the cycle.

FIG. 17 shows how the display interface automatically presents a trigger icon 361 in accordance with the start of the profile for the selected preset icon, prompts the user via entry device 370a) for a desired input parameter 361 in accordance with the displayed icon, and then moves the user through a iterative series of prompts (370b and 370c) to quickly and efficiently enter the parameters for the selected preset profile icons in accordance with the user-specified parameters. Here the user enters a pin position of 5 mm (in 370b) for pin position icon 363, and enters pin velocity 5 mm/sec (in 370c) for travel velocity icon 365. The result is a simulated trace of pin position profile shown in FIG. 18. FIG. 19 shows the simulated profile with an actual position profile overlay on the simulated profile, so the user can compare the two and determine any differences. Differences are noted the user can edit the simulated profile for use in a subsequent cycle, by changing the user input parameters, to attempt to create an actual profile that more closely follows the simulated profile.

As previously described, FIG. 3 shows a virtual entry device 300 (similar to device 370) is overlaid on the user interface by the system and which prompts the user to enter parameters for an associated icon.

Figure 20A:
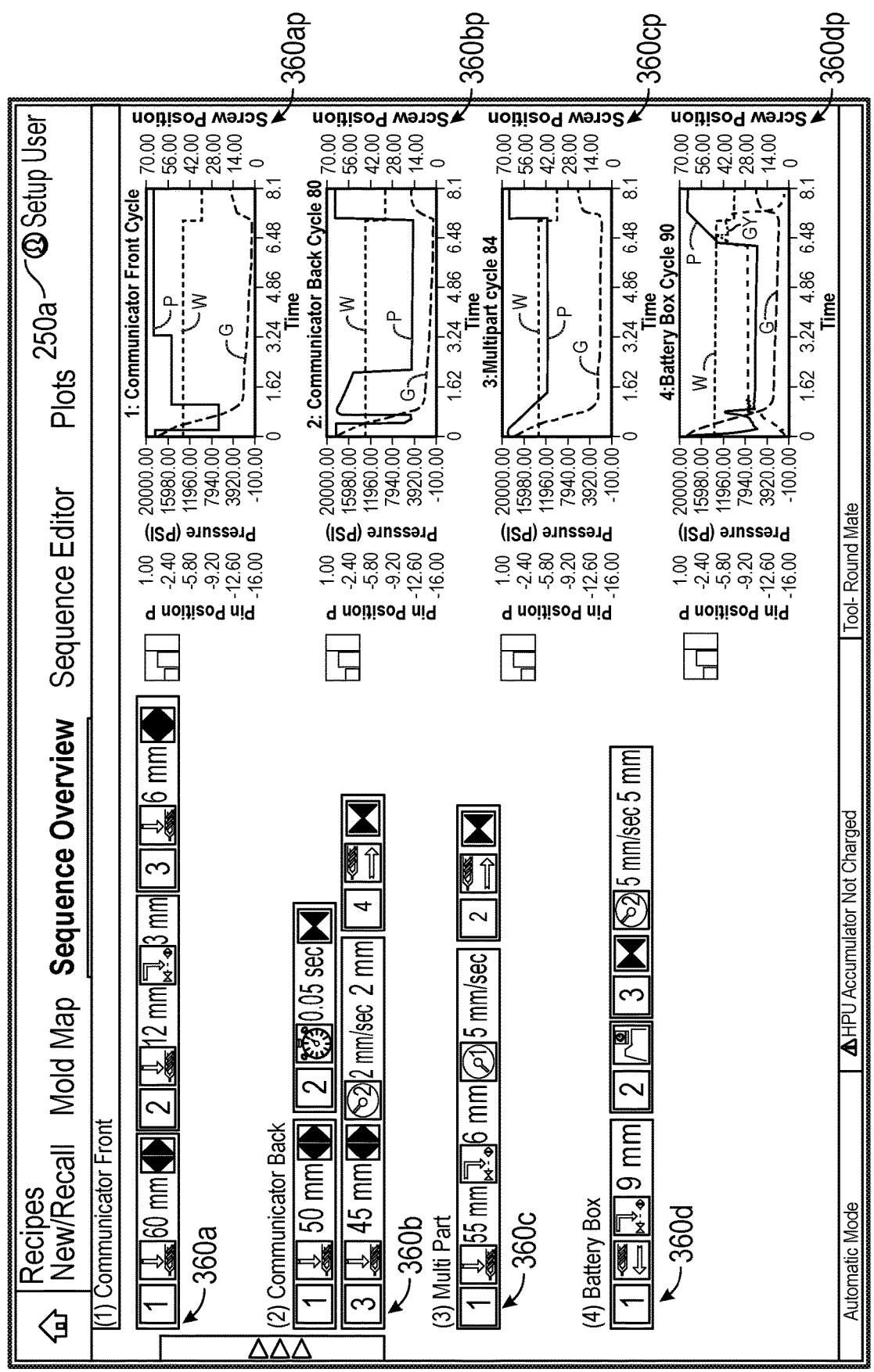
FIGS. 20A-E are screenshots showing an overview of sequences for a plurality of gates of a single mold cavity over the course of an injection cycle and FIG. 20F is a screenshot of a profile editor.
Figure 20B:
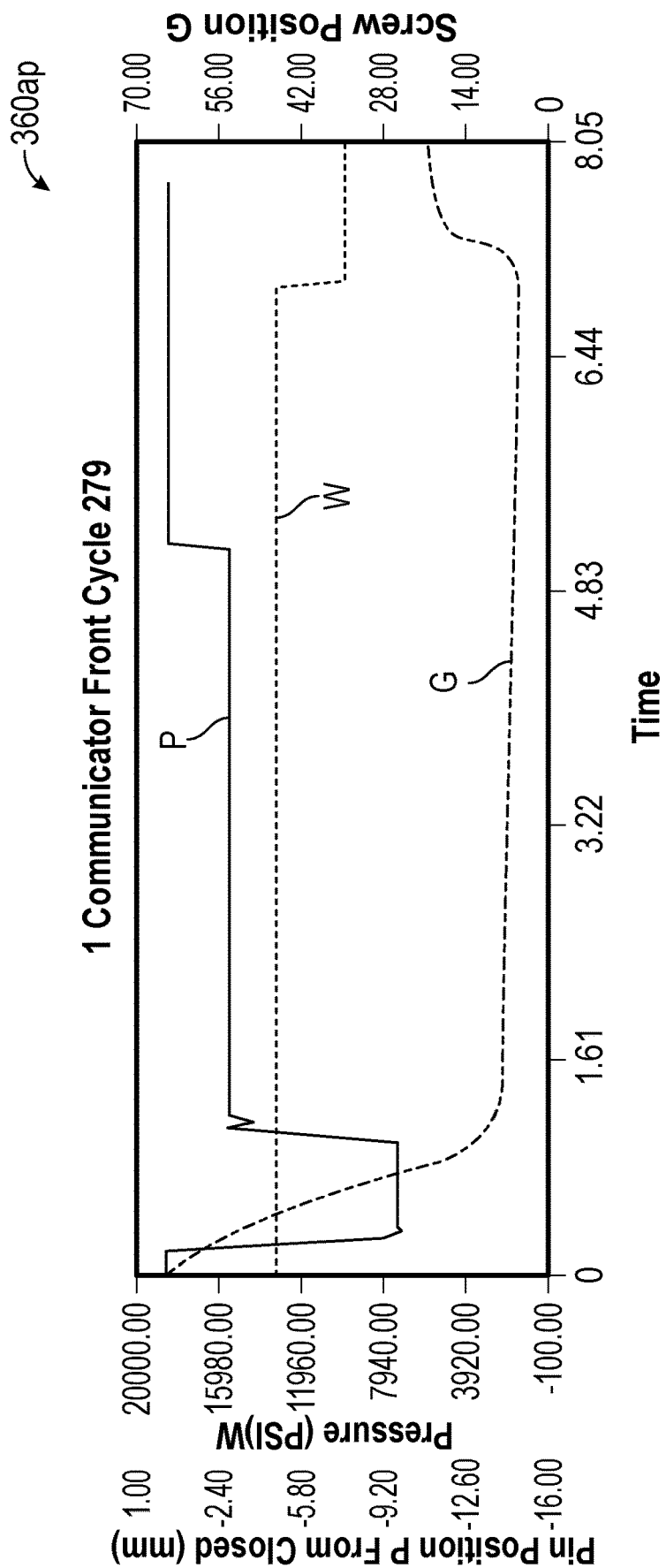
Figure 20C:
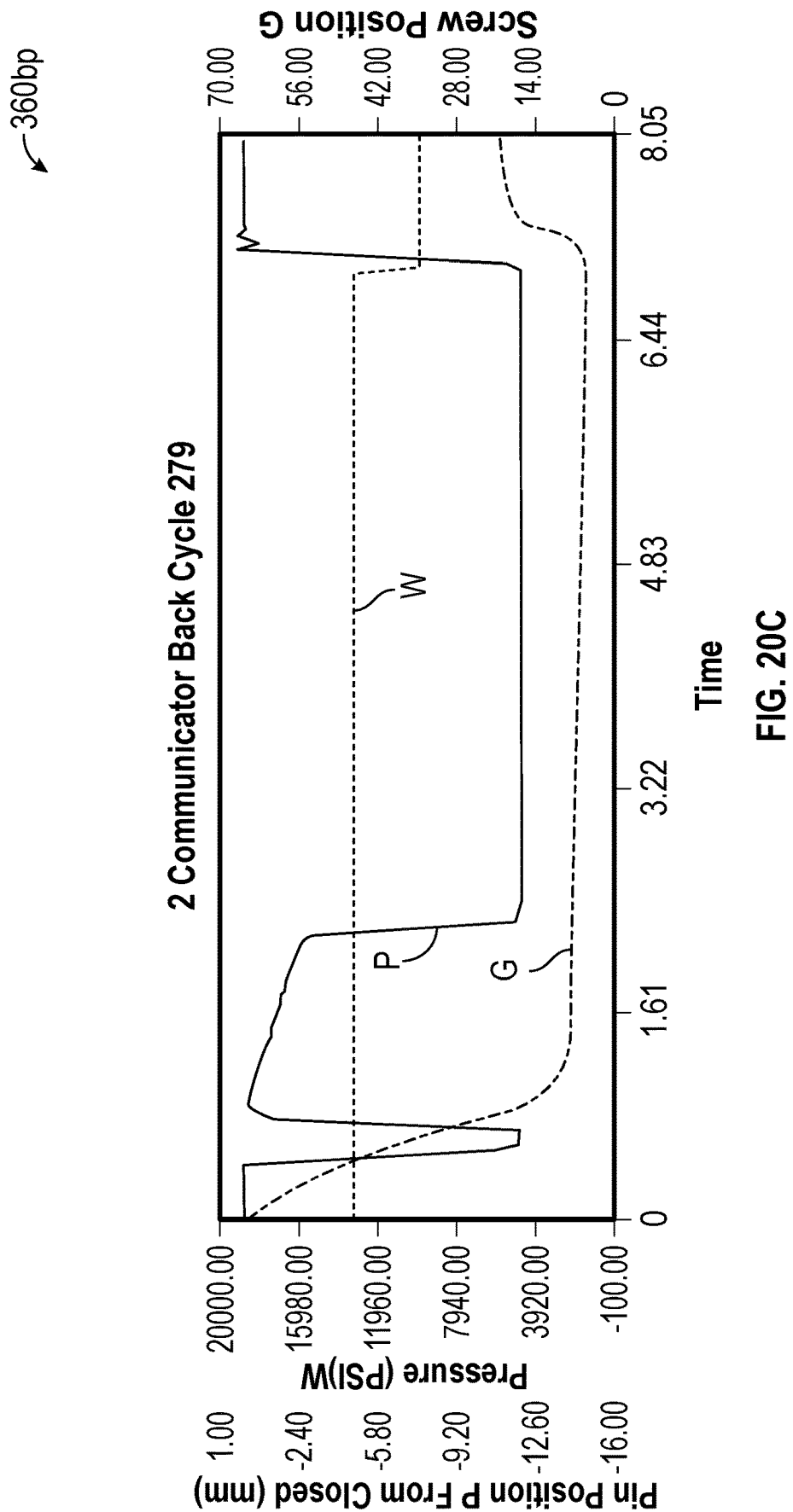
Figure 20D:
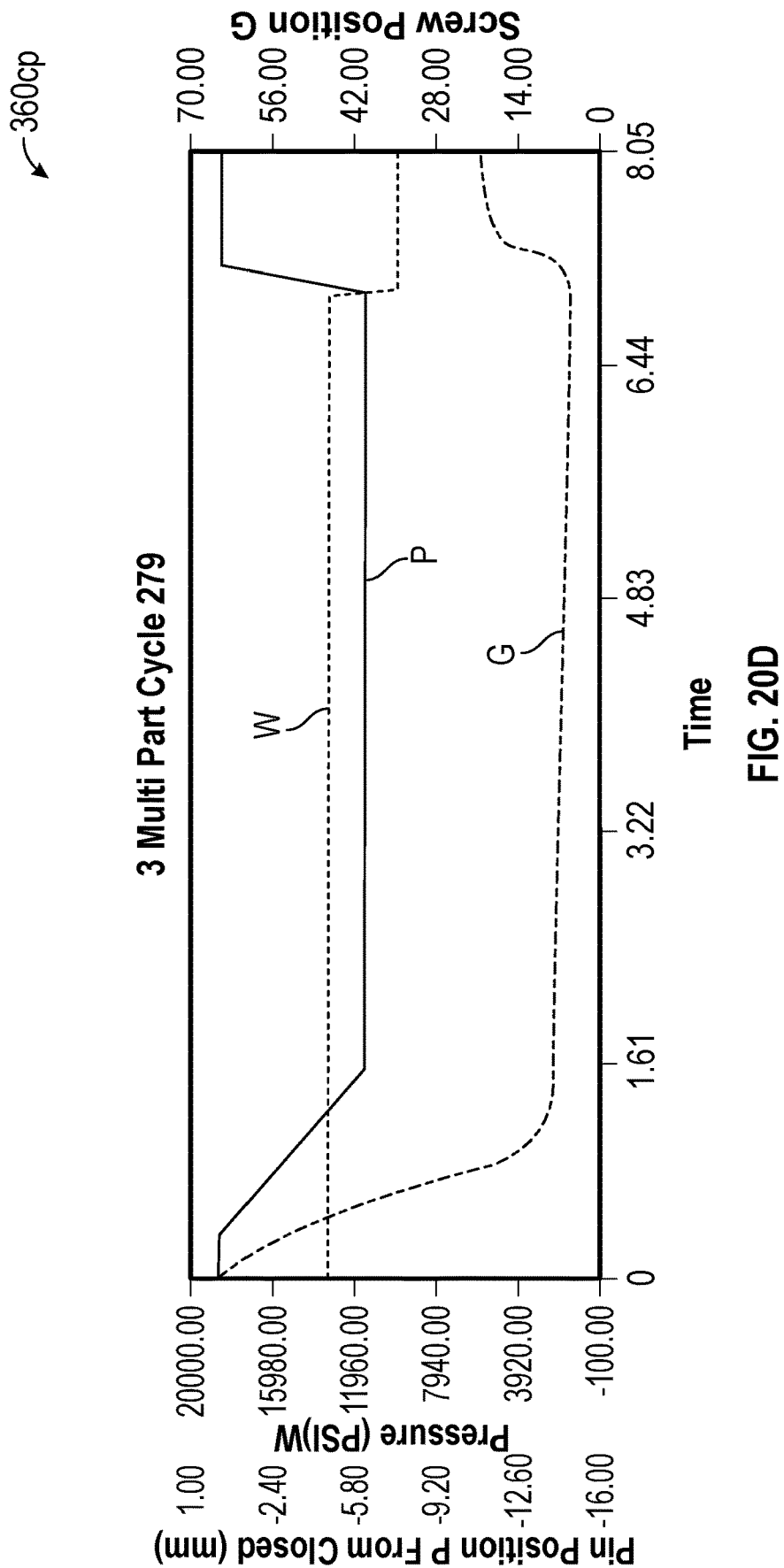
Figure 20E:
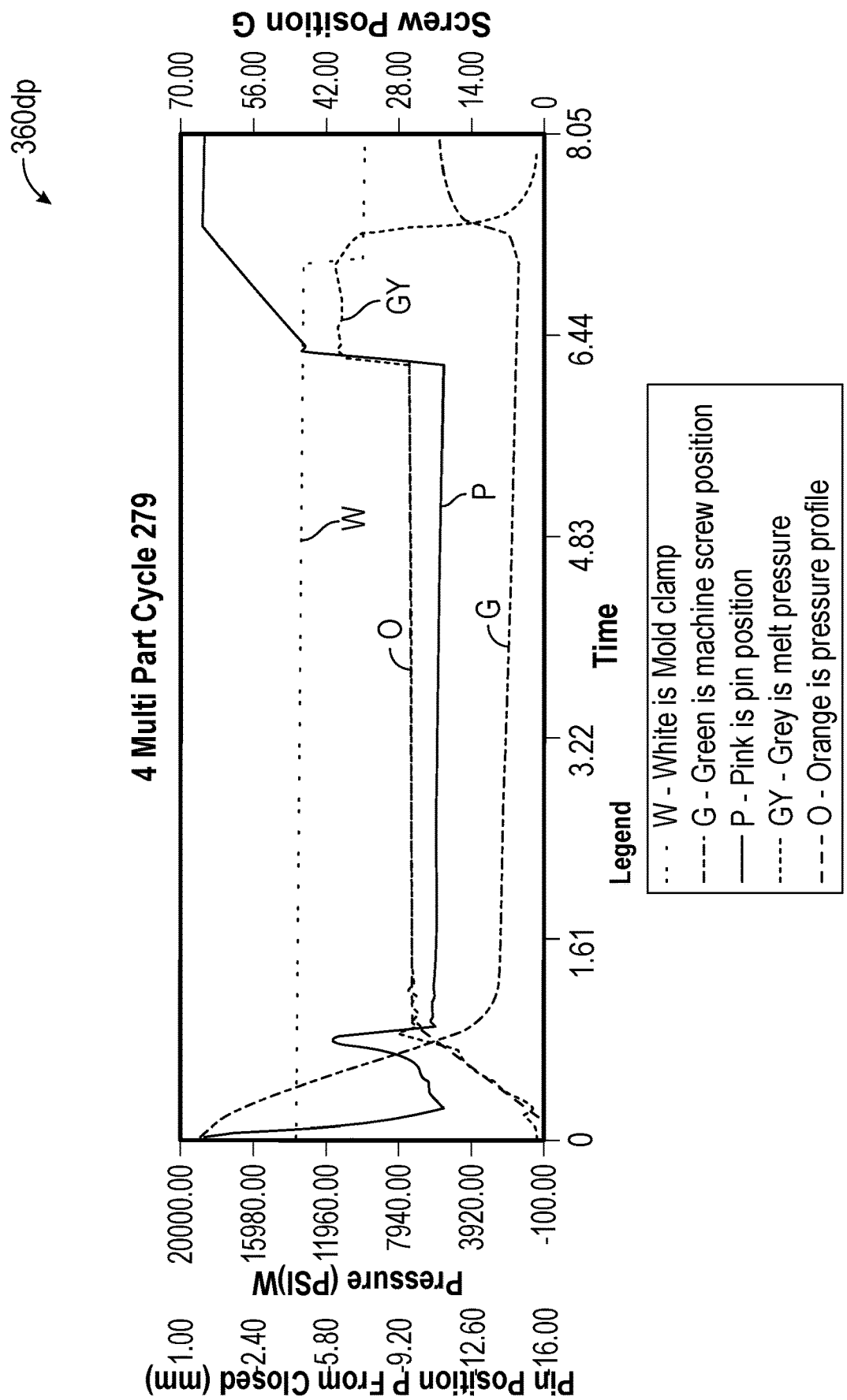
Figure 20F:
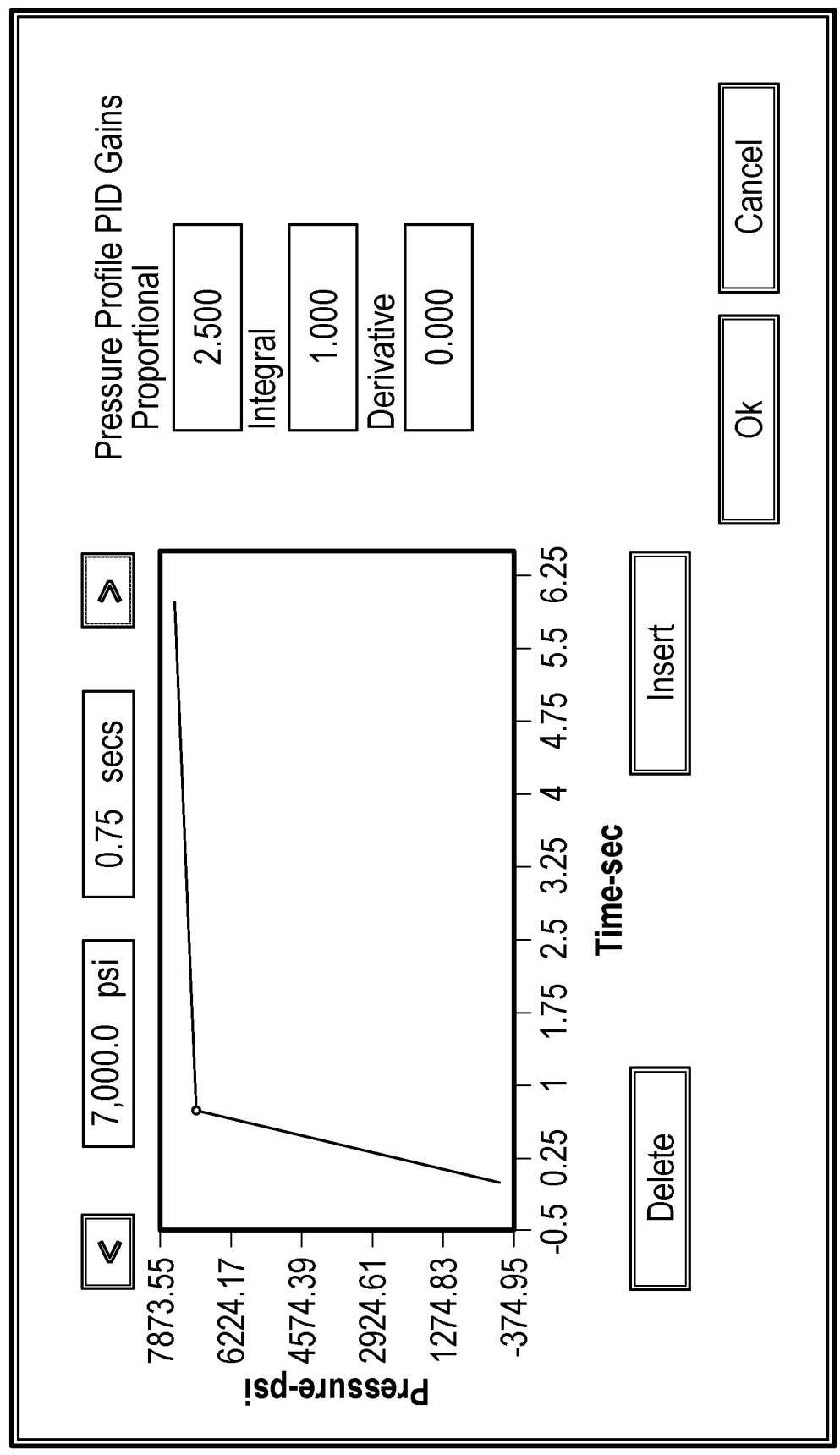

FIGS. 20A-E illustrate one example of a graphical display screen 250a (in FIG. 20A) with four selected sequences 360a, 360b, 360d, 360d for multiple gates (labelled (1) through (4)). These sequences are made from the virtual icons 241 as described in Fig. Each sequence has an associated profile screen which is shown expanded in each of FIGS. 20B-20E as 360ap, 360bp, 360cp and 360dp. The fourth sequence 360d p uses a pressure profile icon (244d in FIG. 2) to establish the sequence 360d. FIG. 20F illustrates one example of a profile editor 395 (a virtual entry device for user entry of values associated with a pressure profile icon). The user can enter a desired profile gain for the various portions of the pressure profile, as shown in FIG. 20E.

In the profiles, the curves are coded as follows:
W white is the mold clamp
G green is the machine screw position
P pink is the pin position
GY grey is the melt pressure
O orange is the pressure profile (244d for sequence 360d).

G. Example of Sequential Valve Gating Apparatus and Method

FIGS. 21-27 describe one embodiment of a molding system and method requiring the sequential programming of multiple valve pins feeding multiple gates of a single mold cavity based on various triggering events over the course of the injection cycle, and providing sensors that detect certain system parameters during the course of the cycle that generate such triggering events and which enable the system to detect an actual profile of valve pin movement for each of the valve pins over the course of the injection. This is just one example of a molding system in which the graphical user interface and control system previously described can be used in accordance with setting and detecting the various triggering events and sequence of pin movements required in such a system.

Figure 21:
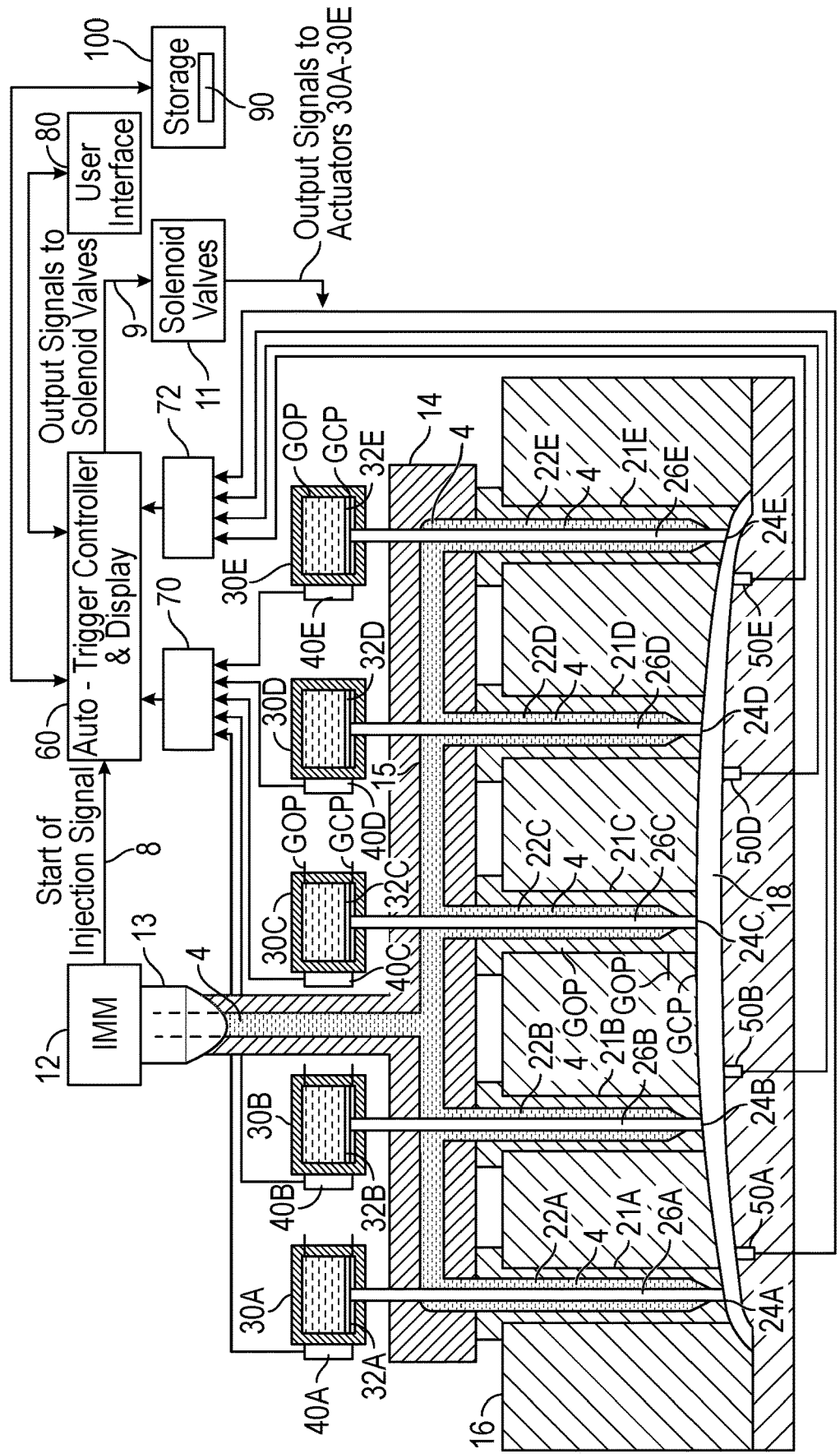
FIG. 21 is a schematic partial sectional view of one embodiment of an injection molding system for performing a sequential valve gating process, requiring the coordinated triggering and movement of multiple vale gate pins to a single cavity over the course of an injection cycle, and in which the control system and method of the present invention may be used to assist the operator in entering a sequence of triggers and pin movements for the multiple valve gate pins.

FIG. 21 is a schematic view of a plastic injection molding apparatus for implementing a sequential valve gating process according to one embodiment of the invention. The injection molding system (IMM) 10 includes an injection molding machine 12, a manifold 14, a mold 16 having a mold cavity 18, a valve gating system 20 including a plurality of nozzles 21 that feed the single mold cavity, an actuator 30 associated with each nozzle, and a controller 60 that activates the valve gating system. The system also includes a plurality of downstream cavity sensors 50, and valve gating position sensors 40, utilized in the present embodiment as described below. Signals from the cavity sensors 50 are transmitted to a junction box 70 enroute to controller 60, while signals from position sensors 40 are transmitted to a junction box 72 enroute to controller 60.

More specifically, the injection molding machine 12 feeds a heated molten fluid material 4 (e.g. a plastic or polymer-based fluid material) through a main inlet 13 to a distribution channel 15 of manifold 14. The distribution channel commonly feeds the fluid material to five separate nozzles 21A, 21B, 21C, 21D, 21E, which in turn all commonly feed into a common cavity 18 of a mold 16 to make one molded part. Each nozzle is actuated by an associated actuator 30A, 30B, 30C, 30D and 30E respectively, wherein each actuator drives an associated valve pin 26A, 26B, 26C, 26D and 26E in the associated nozzle, the respective valve pin being driven reciprocally along an axial upstream and downstream path of travel through a flow passage 22A, 22B, 22C, 22D and 22E in the respective nozzle, between a downstream gate closed position (GCP) and an upstream gate open position (GOP), and vice versa, between the GOP and the GCP. Each actuator has a piston 32A-32E controlled by a solenoid valve for moving the associated valve pin between the GOP and GCP positions. The position sensors 40A-40E detect the position of the piston 32, and thus the position of the associated valve pin 26, between GOP and GCP.

The start of an injection cycle is triggered by a "Start of Injection Signal" 8 sent from IMM 12 to the controller 60. The controller then sends output signals 9 to solenoid valves 11 that drive each actuator. In this example, the first gate to open during an injection molding cycle is the central (also referred to as a first upstream) gate 24C of central nozzle 21C controlled by actuator 30C and arranged so as to feed into cavity 18 at an entrance point (gate 24C) that is disposed at about the longitudinal center of the elongated mold cavity 18. As shown in FIG. 21 and subsequent figures, a first adjacent set of lateral downstream nozzles 21B, 21C, disposed laterally adjacent either side of the central nozzle feed fluid material 4 to downstream gates 24B and 24D disposed laterally an equal distance on either side of the central gate 24C. A second set of lateral downstream nozzles 21A, 21E, downstream of the first pair of lateral nozzles 21B and 21D, feed fluid material 4 into the mold cavity at gate locations 24A and 24E respectively that are downstream of the center gate 24C and downstream of the gates 24B and 24E of the first lateral set of nozzles.

Figure 22:
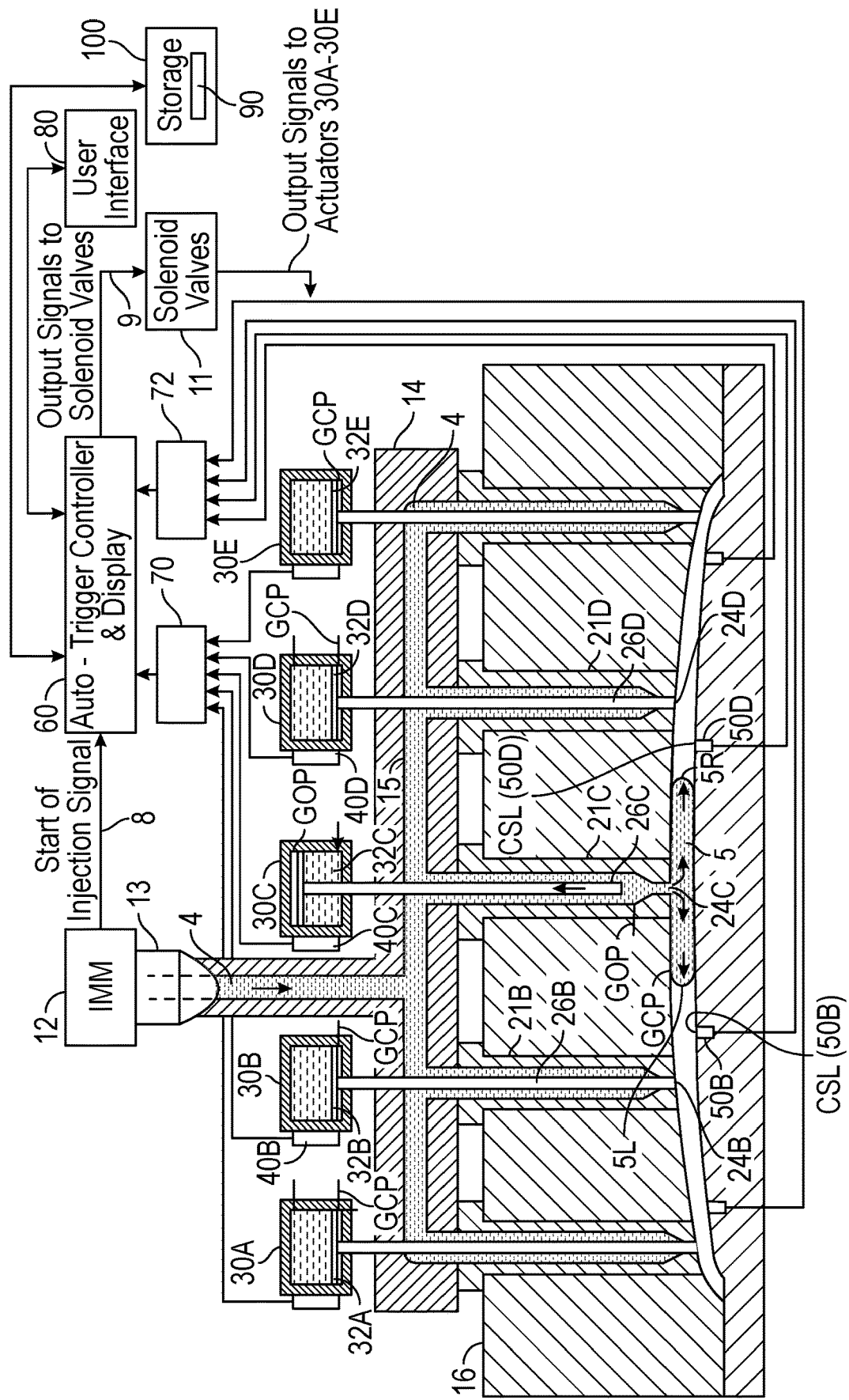
FIG. 22 is a schematic view of the FIG. 21 apparatus at the beginning of an injection sequence, in which a first (center) gate has opened to start a flow of fluid material into a mold cavity.
Figure 23:
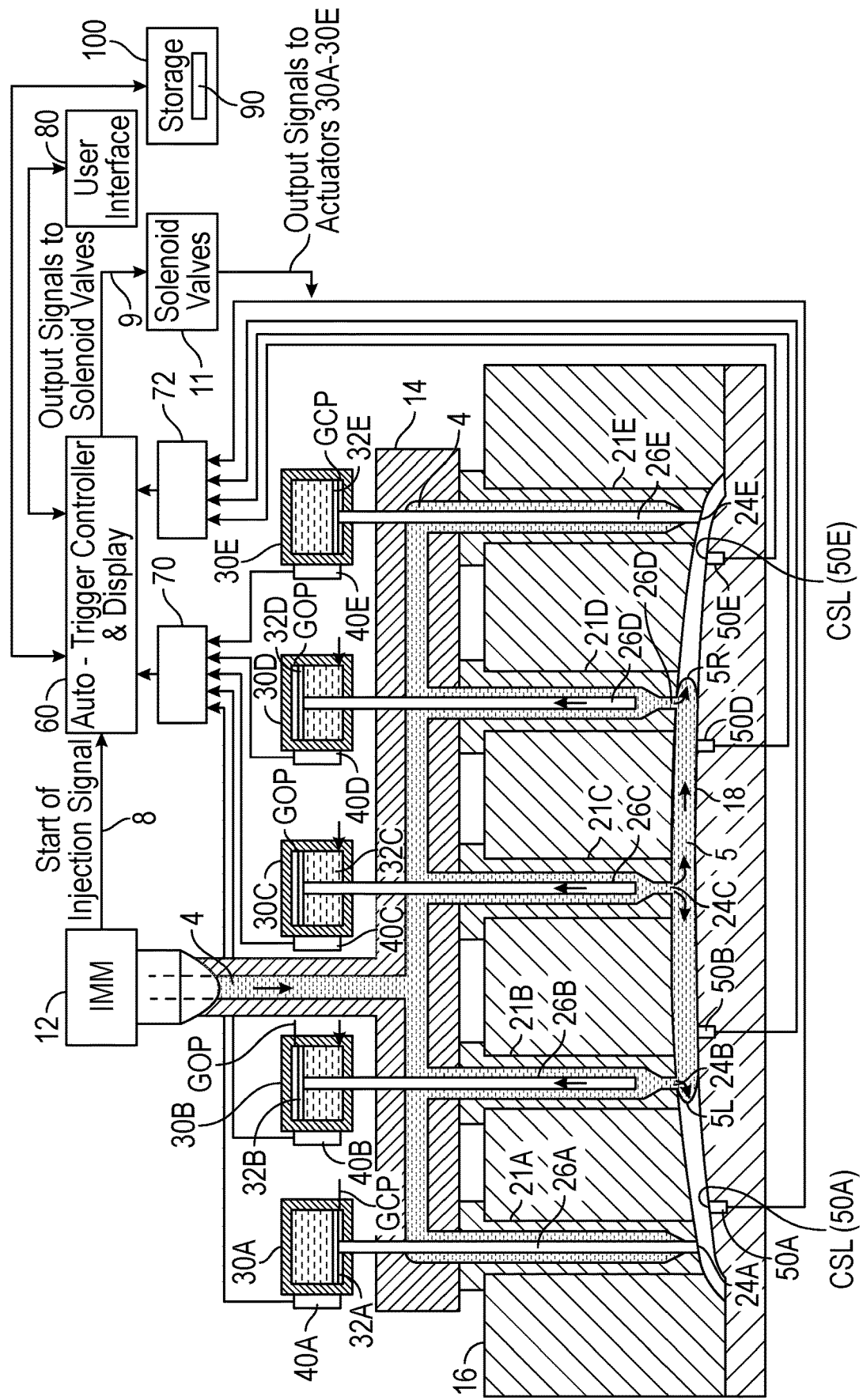
FIG. 23 is a schematic view of the FIG. 21 apparatus, later in the sequence (after FIG. 22), showing a first set of two downstream gates adjacent opposite sides of the center gate now open with fluid material from each of the two downstream gates also entering (flowing into) the mold cavity.
Figure 24:
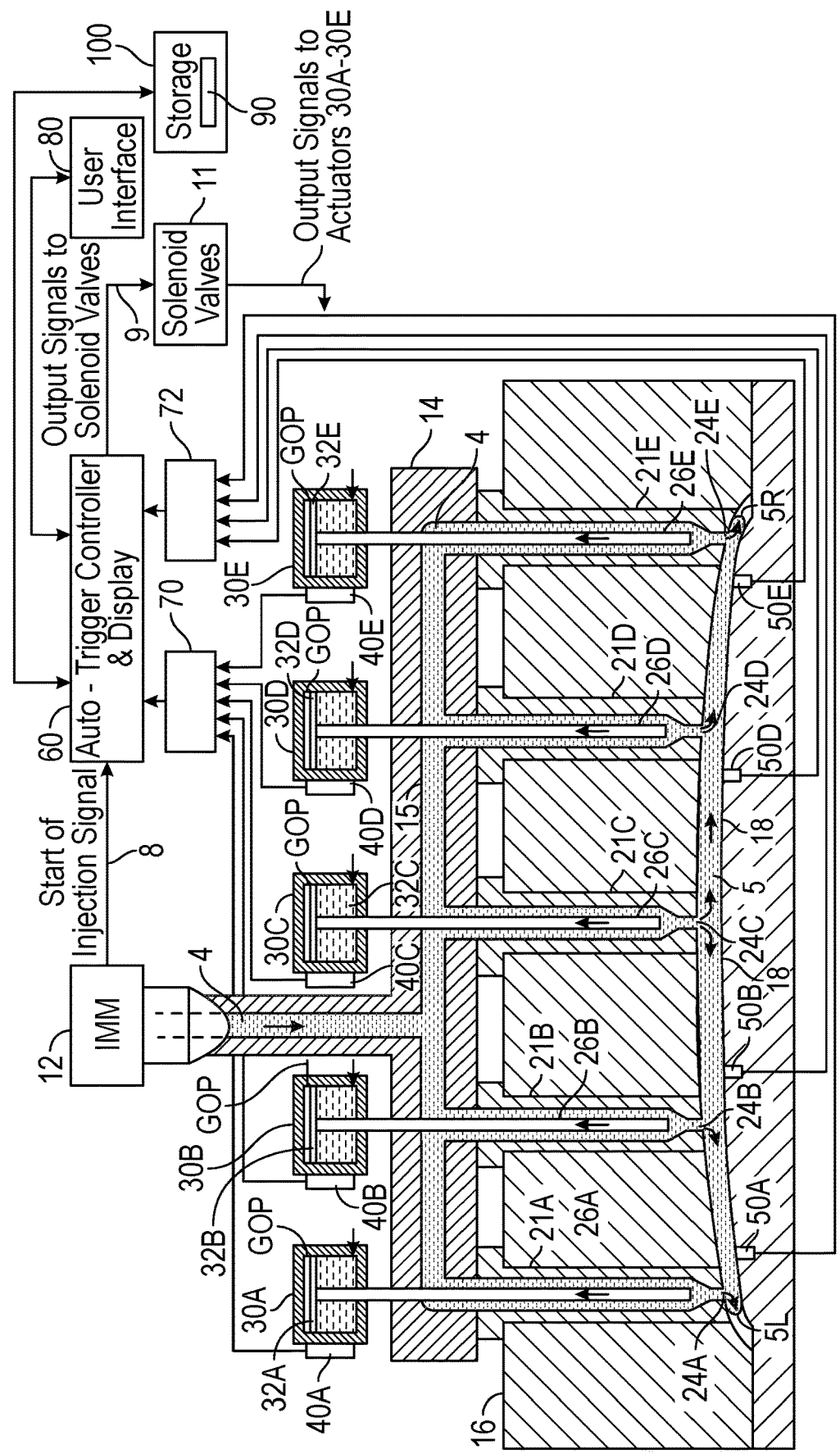
FIG. 24 is a schematic view of the FIG. 21 apparatus, still later in the sequence (after FIG. 23), showing a second set of two downstream gates, each of the second set adjacent and downstream of a respective one of the first set of downstream gates, now open with fluid material from each of the second set (along with fluid material from the center gate and the first set) flowing into the cavity.

As illustrated in FIGS. 22-24 and described further below, the injection cycle is a cascade process where injection is effected in a sequence from the center nozzle 21C and then at a later predetermined time from the first set of downstream nozzles 21B, 21D, and at a still later predetermined time from the second set of further downstream nozzles 21A, 21E. As shown in FIG. 22, the injection cycle is started by first opening the center gate 24C into mold cavity 18 by withdrawing the distal tip 27C of the center valve pin 26C from the gate 24C and allowing fluid material 4 to flow outwardly from nozzle passage 22C into the cavity and form a flow stream 5 moving in opposing lateral directions from the center gate 24C, creating two opposing flow fronts 5R (moving laterally to the right toward next downstream gate 24D) and 5L (moving laterally to the left toward next downstream gate 24B). In accordance with the present embodiment, a plurality of cavity sensors 50B, 50C, 50D and 50E are disposed in or adjacent to the mold cavity 18 for detecting the arrival of flow fronts 5R and 5L at each respective cavity sensor location (CSL) (also referred to as a trigger location). More specifically, between each adjacent set of upstream and downstream nozzle gates, there is disposed a respective cavity sensor for detecting when the flow front reaches the vicinity of the downstream gate, referred to herein as a detection arrival DA. As described later below, when this occurs, a signal is sent to the controller 60 to cause a sequence of subsequent actions that initiate withdrawal of the valve pin of the associated downstream gate (by sending a signal to the downstream actuator to open the downstream valve gate at a predetermined open gate target time (X), specific to that gate, as well as monitoring and detection of the actual open gate time (A) of withdrawal of the valve pin from the downstream gate and generating a signal (sent to controller 60) indicative of actual open gate time (A). The controller then determines whether there is a difference between the predetermined open gate target time (A) and the actual open gate time (A). This difference, referred to as a delay time (Y), can be used to modify the instruction time for initiating withdrawal of the downstream valve pin from the downstream gate during a next or subsequent injection cycle, with a goal toward minimizing or eliminating the time difference.

More specifically, FIG. 22 shows the opposing flow fronts 5R and 5L moving toward the first set of lateral downstream gates 24D and 24B. When the flow front 5R is adjacent to or at the cavity sensor 50D associated with downstream gate 24D (of nozzle 21D), the cavity sensor detects a selected physical condition (e.g., temperature) that signals arrival of the flow front of the fluid material at the cavity sensor location CSL(50D) located between the upstream gate 24C and the downstream gate 24D, and generates a detection arrival signal $S_{DA}$ indicative of the time $t_{(DA)}$ of the detected arrival of the flow front 5R. This detection arrival signal is sent to controller 60 to initiate an instruction signal to actuator 40D (associated with nozzle 21D) to cause subsequent withdrawal of the distal tip of valve pin 24D from gate 24D at a predetermined open gate target time (X) subsequent to the detected arrival time $t_{(DA)}$. A similar series of events occurs for the opposing flow front 5L as it reaches the cavity sensor 50B and generates a detection arrival signal for initiating a subsequent withdrawal of valve pin 26B from gate 24B.

FIG. 23 shows the sequential injection process at a later time in which, following the opening of the first set of lateral downstream gates 24D and 24B whereby fluid material 4 from those gates joins the initial stream (from center gate 24C) to form a combined flow stream 5, the opposing flow fronts 5R and 5L have moved past gates 24D and 24B and are now moving towards the respective second lateral set of downstream nozzle gates 24E and 24A. The respective flow fronts 5R and 5L will be detected by a second set of cavity sensors 50E and 50A associated with the second set of downstream gates 24E and 24A (of nozzles 21E and 21A) for similarly triggering initiation of withdrawal of the respective valve pins 26E and 26A from the second set of downstream valve gates 24E and 24A. The detection will occur as the flow fronts move from the locations shown in FIG. 22 further downstream to a time the flow front arrivals are detected by the cavity sensors 50E and 50A. Similarly, this detection will case the sensors 50E and 50D to generate and send signals $S_{DA}$ controller 60 with times indicative of the detected arrival $t_{(DA)}$, thereby initiating the controller to send gate open signals $S_{GO}$ to the respective actuators 30E and 30A associated with the respective nozzles 21E and 21A to open the respective gates by withdrawing the respective valve pins 26E and 26A at instruction times (X) comprising the predetermined open gate target times (X) for the respective nozzles. The positions of these valve pins will be monitored by position sensors 40E and 40A for the actual open gate time (A) upon withdrawal of the respective valve pins from the gates , the position sensors sending the controller signals indicative thereof whereby the controller can then compare (A) and (X) to determine whether a timing difference exists. If the actual open gate is different from the predetermined open gate target time, the instruction time (X) can be automatically adjusted for use in a subsequent injection cycle in an attempt to eliminate any difference between the instruction time and the actual gate open time during the subsequent injection cycle.

The above process will continue until all nozzles are open and the molded part is filled. Typically, the valve pins all remain open until the end of a packing period, and then the valve gates are closed by a signal from the injection machine.

Thus, in accordance with the present embodiment, adjustments to the instruction time (X) for use in a subsequent cycle can be made where there is a detected difference (delay Y) between the predetermined open gate target time (X) (desired opening time) and actual open gate time (A). Modification of the instruction time (X) can be automatically accomplished by the controller and utilized in the next cycle. Still further, if a valve pin fails to open or is slow in opening, the system may provide an alarm that is activated by such an event.

By way of example, the predetermined open gate target time (X) may be 0.3 seconds, and the actual open gate target time (A) may be 0.4 seconds, meaning there is a difference or delay Y of 0.1 seconds (0.4−0.3=0.1). The adjusted instruction time $X^1$ is then determined to be X-Y, namely 0.3−(0.4−0.3)=0.2 seconds. On the next or subsequent cycle the modified instruction time (X') will be 0.2 seconds.

It has been found that triggering based on the flow front detection, instead of the time or screw position, can significantly enhance the quality of the molded parts. It can also substantially reduce the set-up time and reduce the need for highly experienced operators. The triggering process can be used to automatically adjust the open gate instruction time (X) when melt viscosity changes, from one cycle to the next. The actual valve pin opening times can be displayed on a user interface (e.g., a computing device 80 with a display and user input as shown in FIG. 21), thus enabling an operator to monitor the performance of the sequential process and make manual adjustments (e.g., to the timing, temperature, pressure or other system parameters) if desired.

Figure 25:
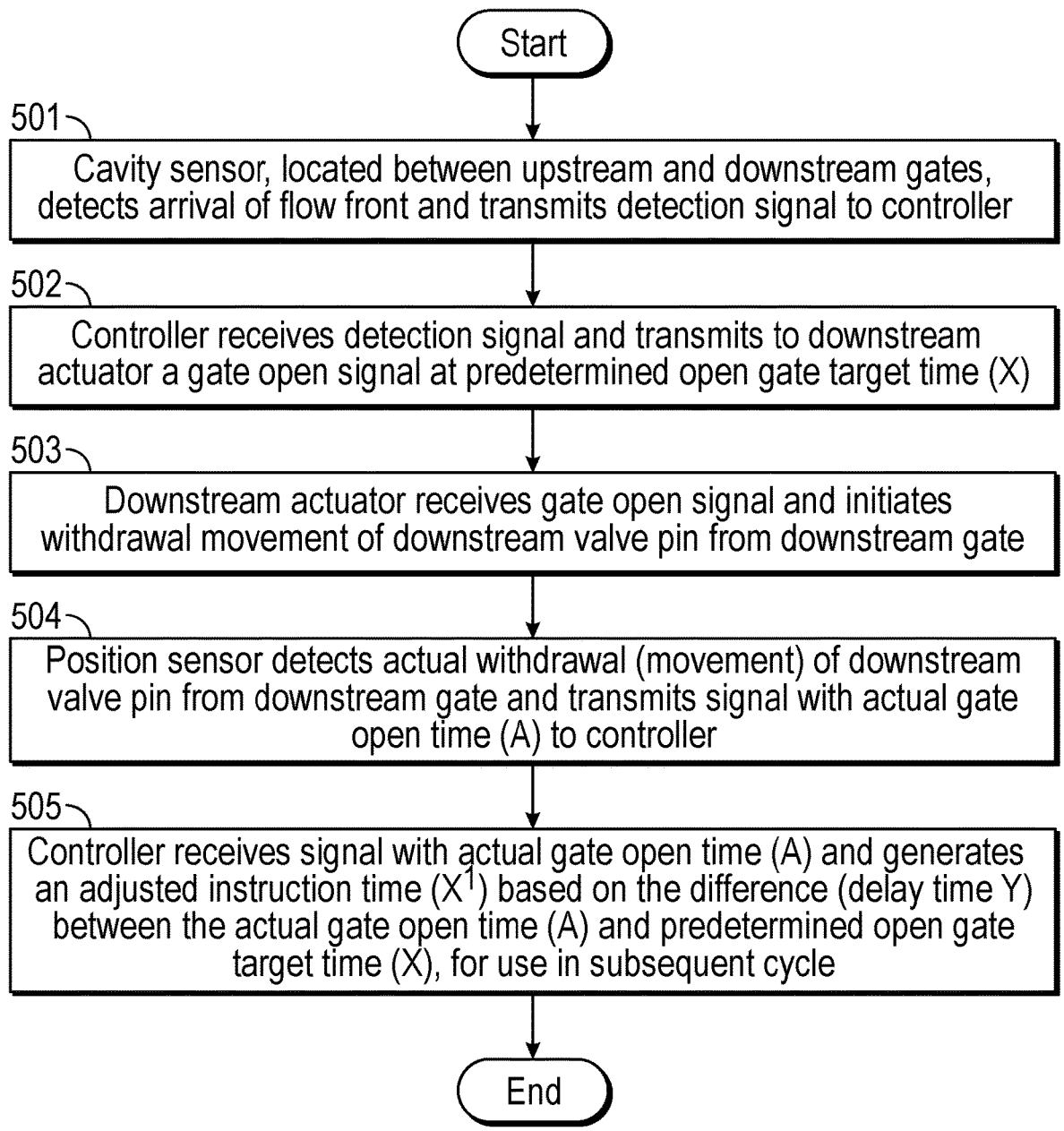
FIG. 25 is a flow chart showing one embodiment of a sequence of steps according to one method embodiment of the invention.

FIG. 25 is a flowchart showing a sequence of steps 501-505 according to one method embodiment comprising:
  cavity sensor, located between upstream and downstream gates, detects arrival of flow front and transmits detection signal to controller (step 501)
  controller receives detection signal and transmits to downstream actuator a gate open signal at predetermined open gate target time (X) (step 502)
  downstream actuator receives gate open signal and initiates withdrawal movement of downstream valve pin from downstream gate (step 503)
  position sensor detects actual withdrawal (movement) of downstream valve pin from downstream gate and transmits signal with actual gate open time (A) to controller (step 504)

controller receives signal with actual gate open time (A) and generates an adjusted instruction time (X') based on the difference (delay time Y) between the actual gate open time (A) and predetermined open gate target time (X), for use in subsequent cycle (step 505).

The following timing sequence illustrates one embodiment of the invention:

Timing Sequence

| Time | Event |
|---|---|
| $t_{0a}$ | start of cycle a |
| $t_{1a}$ | predetermined start injection time for center gate to open |
| $t_{2a}$ | cavity sensor located between center gate and first downstream gate detects flow front |
| $t_{3a}$ | predetermined open gate target time for first downstream gate to open |
| $t_{4a}$ | actual open gate time first downstream gate opens (based on opening movement of valve pin) |
| ... | |
| $t_{0b}$ | start of subsequent cycle b |
| $t_{1b}$ | predetermined start injection time for center gate to open |
| $t_{2b}$ | cavity sensor located between center gate and first downstream gate detects flow front |
| $t_{3b}$ | Adjusted instruction time for first downstream gate to open (based on difference between predetermined open gate target time $t_{3a}$ and actual open gate time $t_{4a}$ in cycle a) |
| ... | |

The preselected condition (e.g., physical property) of the fluid that the cavity sensor detects (senses) may be from example, pressure or temperature. As used herein, the detection (sensing) includes one or more of a numerical value or a change in value of the property.

The position sensor may be any of various known sensors such as a hall effect sensor as described in Tan et al., U.S. Pat. No. 9,144,929 issued Sep. 29, 2015 entitled "Apparatus and Method of Detecting a Position of an Actuator Position," assigned to Synventive Molding Systems, the disclosure of which is incorporated by reference as if fully set forth in its entirety herein. Alternatively, the position sensor may be an encoder (e.g., for use with an electronic actuator).

The actuation system as shown comprises a fluid driven actuator 30. A preferred fluid driven valve system comprises a fast acting linear force motor driven proportional valve that regulates the flow of either gas or liquid to the actuator 30, namely either a pneumatic or hydraulic system. A fast acting fluid control valve system is described in detail in PCT/US2014/31000 and in U.S. Pat. No. 5,960,831, the disclosures of both of which are incorporated herein by reference can be used in the apparatuses described herein particularly where pneumatic valve control systems are preferred for the particular application.

Alternatively, an electronic (electrically powered) actuator system, having an electric motor rotor interconnected to the valve pin, may be used. See for example the electrically powered actuator systems disclosed in U.S. Pat. Nos. 6,294,122, 9,492,960, and 9,498,909, the disclosures of which are incorporated by reference as if fully set forth in their entirety herein.

Another Embodiment

In another embodiment, instead of triggering based on detecting the flow front in the cavity, the triggering is based on a start of injection cycle or screw position in the barrel.

Figure 26:
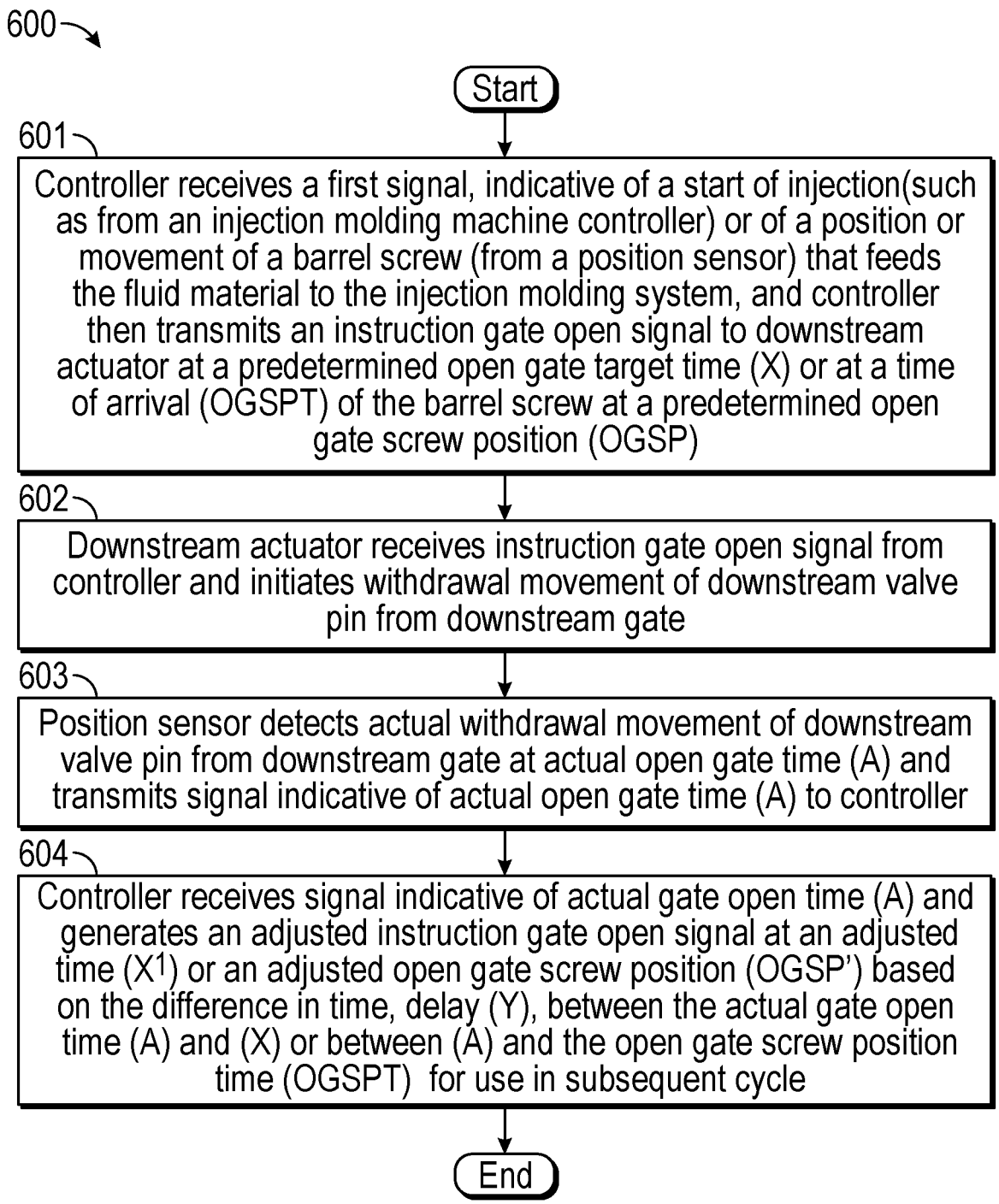
FIG. 26 is a flow chart of another embodiment of a sequence of steps according to another method embodiment of the invention.

FIG. 26 illustrates a method according to this embodiment, and FIG. 2 illustrates an apparatus that can be used in this embodiment.

FIG. 26 is a flowchart showing a sequence of steps 601-604 according to one method embodiment comprising:
controller receives a first signal, indicative of a start of injection or a position of a barrel screw that feeds the fluid material to the injection molding system, and transmits to a downstream actuator a gate open signal at a predetermined open gate target time (X) based on the first signal (step 601)
downstream actuator receives gate open signal and initiates withdrawal movement of downstream valve pin from downstream gate (step 602)
position sensor detects actual withdrawal (movement) of downstream valve pin from downstream gate and transmits signal indicative of the actual gate open time (A) to controller (step 603)
controller receives signal indicative of actual gate open time (A) and generates an adjusted instruction time (X') based on the difference (delay time Y) between the actual gate open time (A) and predetermined open gate target time (X), for use in subsequent cycle (step 604).

FIG. 27 shows one system embodiment 710 of the invention comprised of an injection machine 715 that feeds melt-able injection material that is converted from solid form 717 into molten or liquid flowing fluid material form 718 within the barrel 719 of the machine 715 by a screw 716. The screw 716 is controllably rotated at a selected rate such that the helical threads 714 of the screw 716 drive the molten fluid material 718 downstream under a controllably variable pressure and controllably variable amount of fluid into a fluid distribution channel 765 of a hot runner or manifold 760 depending on the rate and degree of rotation of the screw 716. The fluid distribution channel 765 can commonly feed into the downstream flow passage(s) 7115 of the injection nozzle(s) 7110 of one or more of multiple valve gates or valves 711, 711*a*, 711*b*, 711*c*.

Each valve 711, 711*a*, 711*b*, 711*c* is comprised of an actuator 730 and a mounted nozzle 7110. Each nozzle 7110 of each valve 711, 711*a*, 711*b*, 711*c* routes the molten fluid material 718 that is received from a single common source (fed from barrel 719, through an inlet 719*b* that interconnects the barrel to the manifold, and then through the common manifold channel 765 through a nozzle passage 7115 to and ultimately through a respective gate 785, 785*a*, 785*b*, 785*c* of the nozzles associated with each valve 711, 711*a*, 711*b*, 711*c* to a single cavity 780 of a mold 770. Here, each of the multiple valves 711, 711*a*, 711*b*, 711*c* inject into the mold cavity 780 (typically in a cascade or sequential manner) during the course of a single injection cycle as previously described (with respect to the prior embodiment of FIG. 21).

The system 710 employs a sensor 790 that senses or detects a linear or rotational position of the barrel screw 716, at a start or initial portion of the injection cycle such that detection of initial movement or a selected position of the screw 716 by the sensor 790 can be used to define the start or start time of an injection cycle. The sensor 790, which in this embodiment is shown as detecting the rotational position of a motor 791 that drivably rotates the screw 716, the rotational position of the motor 791 corresponding to the rotational or linear position of the screw. A predetermined open gate screw position OGSP is selected by the user. The position sensor 790 detects the predetermined open gate screw position OGSP and sends a signal 795 indicative of that position (or the time OGSPT associated with detecting such position) to the controller 760. The signal 795 that is sent to controller 760 may be a continuous real time signal indicative of the screw position along its entire course of rotation or path of travel. Detection by the position sensor 790 of the original predetermined open gate screw position OGSP and any subsequently automatically adjusted open gate screw positions (OGSP') are used as triggers by the controller to instruct the downstream valves 711*a*, 711*b*, 711*c* and their associated gates to open on the first and subsequent injection cycles.

The controller 760 includes instructions that use the received signal 795 as a control value that controls one or more valve pins 7112 of the one or more valves 711, 711*a*, 711*b*, 711*c* such that the one or more valve pins 7112 are driven through an upstream path of travel beginning from the gate closed position to open the respective valve gate, at a predetermined open gate target time (X) for the respective gate. In one embodiment, the valve 711 may be designated as the first upstream gate to open, followed by subsequent openings of the remaining gates 785*a*, 785*b* and 785*c* each at their respective predetermined open gate target times (X) as triggered by the start signal 795. In another embodiment, the IMM sends a start of injection signal 708 that is used as the control value and trigger to open the respective gates, instead of the screw position signal 795. In this later embodiment, the screw position sensor 790 and signal 795 are not required.

FIG. 27 illustrates the components of one valve 711 in detail. For ease of explanation, each valve 711*a*, 711*b*, 711*c* is typically comprised of the same components as described with reference to valve 711, each valve being commonly fed by the injection fluid material 718 flowing from barrel 719 through inlet 719*b* to the manifold and further flowing through downstream manifold channel 765. Manifold channel 765 is shown and referred to as one example of a common fluid flow channel.

As shown, the distal end of nozzle 7110 has a gate 785 (here the upstream gate to the mold cavity 780) that is controllably openable and closeable by a valve pin 7112 to start and stop the flow of material 718 through gate 785. Such controlled gate opening and closing is effected by controlled reciprocal upstream and downstream movement A of valve pin 7112 that is controllably driven by a pneumatic actuator 730 that is in turn controllably driven most preferably by a fast acting linear force motor or valve 720. The downstream distal tip end of the valve pin 7112 initially closes the gate 785 at the start of an injection cycle. When an injection cycle is initiated the valve pin 7112 is withdrawn upstream opening the upstream gate 785 and allowing the molten fluid material 718 to flow through the gate 785 into the cavity 780 of the mold 770. The downstream gates 785*a*, 785*b*, 785*c* are then open in sequence at each of their predetermined open gate times. Valve pin position sensors 732, similar to position sensors in FIG. 21, are mounted on each actuator 730 for each valve 711, and used to detect the actual open gate time (A) of the respective downstream gate which is then compared with the predetermined open gate target time (X) for the respective downstream gate, in order to determine an adjustment time equal to any delay in time (Y) between the predetermined open gate time (X) and the actual open gate time (A). See the discussion in the prior embodiment of FIGS. 21-25 regarding use of the valve pin position sensors 40 and determination of an adjusted instruction time (X') for use on a subsequent injection cycle.

Returning to the FIG. 27 embodiment, at time zero of the injection cycle (start of injection signal received from the IMM 715 or screw position signal 795 received from the sensor 790), the first upstream valve 711 is initially opened (with all other downstream valves 711*a*, 711*b*, 711*c* remaining closed) and the screw 716 is simultaneously started up to begin rotating and thus increasing the pressure in barrel 719*a*, inlet 719*b* from an initial zero up to a desired level. At a later time the second valve pin associated with the second valve 711*a* is initially withdrawn from its associated gate. With the first and second valves 711, 711*a* now open and third and fourth valves 711*b*, 711*c* still closed, the pressure is increased as the screw continues to inject injection fluid into the system until the pressure reaches a desired pressure when the pin associated with the third valve 711*b* is opened from its associated gate. Now with the first and second and third valves 711, 711*a*, 711*b* open and valve 711*c* still closed, the pressure is increased as the screw continues to inject injection fluid into the system until the pressure reaches a desired pressure at which time the pin associated with the fourth valve 711*c* is withdrawn from tis associated gate. With all four valves now open and the screw under constant power drive force, the pressure continues to rise up to a final constant or steady pressure.

In embodiments where the controller 760 controls all of the multiple valve gates 711, 711*a*, 711*b*, 711*c* during an injection cycle, the controller 760 includes a pin sequence instruction that can instruct and execute the opening and upstream pin withdrawal movement of each separate valve 711, 711*a*, 711*b*, 711*c* in any preselected timed sequence.

The actuators associated with gates 711, 711*a*, 711*b*, 711*c* typically comprise a pneumatic or hydraulic actuator or can also comprise an electric actuator, the controller 760 being adapted to control the drive mechanism for each such kind of actuator. In the case of a pneumatically or hydraulically driven actuator, the drive mechanism is an electrically drivable mechanism interconnected to a fluid flow control valve similar to valve 720. In the case of an electric actuator the drive mechanism is typically an electric motor that is controllably drivable by an electronic controller 760.

Each separate valve 11, 11*a*, 11*b*, 11*c* can feeds into a single cavity 780 of a single mold or can each feed separately into separate cavities of separate molds (not shown for valves 11*a*, 11*b*, 11*c*).

In order to reduce or eliminate the visibility of the lines or blemishes in the final molded part, a fast acting motor 20 that acts as the actuator for a valve can be employed.

The controller 760 instructs the actuators 730 et al. associated with the gates via signals 210, 210*a*, 210*b*, 210*c* generated by an algorithm contained in the electronic controller 760 to withdraw the pins associated with the valves 711, 711*a*, 711*b*, 711*c* at an upstream withdrawal velocity that can be controlled along any portion of the upstream or downstream travel path or stroke of the valve pins.

In a typical embodiment, the first valve 711 is initially opened with all other downstream valves 711*a*, 711*b*, 711*c* being closed until instructed to sequentially open at sequentially subsequent times as described herein.

H. Computing Device

FIG. 28 illustrates an example computing system architecture 1000 wherein the components of the system 1000 are in communication with each other using a connection 1005. Connection 1005 can be a physical connection via a bus, or direct connection into processor 1010 such as in a chipset architecture. Connection 1005 can also be a virtual connection, networked connection, or logical connection. The connection can be wired or wireless (such as a Bluetooth connection).

In some cases, the system 1000 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 1000 includes at least one processing unit (CPU or processor) 1010 and a connection 1005 that couples various system components including the system memory 1015, such as read only memory (ROM) 1020 and random access memory (RAM) 1025 to the processor 1010. The system 1000 can include a cache of high-speed memory 1012 connected directly with, in close proximity to, or integrated as part of the processor 1010.

The processor 1010 can include any general purpose processor and a hardware service or software service, such as service 1 1032, service 2 1034, and service 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include code that when executed by the processor 1010, causes the system 1000 to perform a function. A hardware service that performs a particular function can include the software component stored in a computer-readable medium in connection with the hardware components, such as the processor 1010, bus 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

While specific embodiments of the present invention have been shown and described, it will be apparent that many modifications can be made thereto without departing from the scope of the invention. Accordingly, the invention is not limited by the foregoing description.

What is claimed is:

1. a valve gating system including a fluid flow passage for delivering fluid material to a gate of a mold cavity, and an actuator that drives a valve pin between a downstream gate closed position and an upstream gate open position; a controller programmed to execute a set of instructions that define user selected control functions and event triggers for generating and transmitting instructions to the actuator to drive the valve pin between the open and closed positions during the course of an injection molding cycle; a graphical computer user interface programmed to: display, on a user display screen portion, different groups of user selectable drag and drop virtual icons including trigger icons and move-to icons, wherein the trigger icons each represent a different preselected event to trigger a subsequent movement of the valve pin, and the move-to icons each represent a different preselected control function that initiates an associated movement of the valve pin; enable a user to select, arrange and rearrange a plurality of such drag and drop virtual icons into user defined sets on another display screen portion, wherein each user defined set includes at least one trigger icon and at least one move-to icon and the user defined sets are rearrangeable relative to one another; in response to user selection of at least one trigger icon or move-to icon in the user defined set, the user interface is programmed to prompt the user to enter a parameter value associated with the selected trigger icon or move-to icon, and to create and place in the user defined set adjacent to the associated trigger icon or move-to icon a parameter virtual icon displaying the parameter value; wherein the virtual icons of the user defined sets define an ordered sequence of event triggers, control functions and parameter values to be implemented by the controller to drive the valve pin during the course on an injection cycle.

2. An injection molding system according to claim 1, the user selectable drag and drop virtual icons for inclusion in the user defined sets further including:
   a velocity control icon virtually representing a preselected control function to set a travel velocity for an associated movement of the valve pin.

3. An injection molding system according to claim 1, the user selectable drag and drop virtual icons for inclusion in the user defined sets further including:
   a timer icon virtually representing a preselected control function to set a delay time before initiating an associated movement of the valve pin.

4. An injection molding system according to claim 1, the user selectable drag and drop virtual icons for inclusion in the user defined sets further including:
   one or more preset icons each virtually representing a preselected plurality of control functions that define a sequence of associated movements of the valve pin.

5. An injection molding system according to claim 1, the user selectable drag and drop virtual icons for inclusion in the user defined sets further including:
   one or more sensitivity icons each virtually representing a preselected control function defining a control sensitivity for an associated movement of the valve pin.

6. An injection molding system according to claim 1, wherein:
   a further portion of the screen displays a simulated pin profile trace that is produced by the event triggers, and control functions and parameter values associated with the virtual icons of the ordered sequence.

7. An injection molding system according to claim 1, wherein:
   the user interface is arranged to accept user input for selection among one or more of storing, copying, and editing the ordered sequence.

8. An injection molding system according to claim 1, wherein:
   the user selectable drag and drop virtual icons for inclusion in the user defined sets further include one or more virtual control icons selected from the group consisting of velocity control, delay timer, preset plurality of control functions, and control sensitivity icons; and
   in response to user selection of one of the virtual control icons, the user interface is programmed to prompt the user via an entry device to enter a parameter value further defining an the associated control function for the selected virtual control icon and to create and place in the user defined set adjacent to the associated virtual control icon a parameter value virtual icon displaying the parameter value.

9. An injection molding system according to claim 1, wherein:
   the move-to icons include virtual icons representing control functions for an associated movement toward the gate open position, toward the gate closed position, and toward a user selectable intermediate position.

10. An injection molding system according to claim 1, wherein:
    the move-to icons include a pressure profile virtual icon representing control functions for an associated sequence of valve pin movements to follow a pressure profile over time.

11. An injection molding system according to claim 1, wherein:
    the controller is programmed to direct the actuator to drive the valve pin at a travel velocity in a range from zero to a maximum velocity and including one or more intermediate travel velocities between zero and the maximum.

12. An injection molding system according to claim 1, wherein:
    the controller is programmed to direct the actuator to drive the valve pin to a predetermined hold and pack position between the open and closed positions.

13. An injection molding system according to claim 1, wherein the controller is programmed to monitor the injection molding system and upon occurrence of a trigger event associated with the selected virtual trigger icon generates and sends instructions to the actuator to initiate the valve pin movement associated with the next move-to-icon of the ordered sequence.

14. An injection molding system according to claim 1, wherein the graphical computer user interface is programmed to further display on another portion of the display screen:
    a simulated valve pin profile or pressure profile trace according to the ordered sequence; and
    an actual valve pin profile or pressure profile trace based on actual response data of the valve gating system when implementing the ordered sequence.

15. An injection molding system according to claim 1, wherein the user selectable drag and drop trigger icons include a machine screw position icon, and the virtual parameter value icons include a machine screw parameter value for the machine screw position.

16. An injection molding system according to claim 15, wherein the graphical computer user interface is programmed to further display on another portion of the display screen, a layered graph including:
- a first layer of the graph comprising a simulated valve pin profile trace representing a position of the valve pin versus time according to the ordered sequence; and
- a second layer of the graph, overlying the first layer, comprising a simulated machine screw position profile trace representing a position of the machine screw according to the ordered sequence.

* * * * *

UNITED STATES PATENT AND TRADEMARK OFFICE
CERTIFICATE OF CORRECTION

| | |
|---|---|
| PATENT NO. | : 11,759,988 B2 |
| APPLICATION NO. | : 16/217443 |
| DATED | : September 19, 2023 |
| INVENTOR(S) | : Sergio Ribeiro de Oliveira Antunes et al. |

It is certified that error appears in the above-identified patent and that said Letters Patent is hereby corrected as shown below:

In the Claims

Column 39, Line 5 (Claim 1) add --An injection molding system for initiating flow of fluid material into one or more gates of a mold cavity during an injection molding cycle, the system comprising:-- before "a valve gating".

Signed and Sealed this
Thirty-first Day of October, 2023

*Katherine Kelly Vidal*

Katherine Kelly Vidal
*Director of the United States Patent and Trademark Office*